United States Patent
Kotani

(10) Patent No.: US 10,574,949 B2
(45) Date of Patent: Feb. 25, 2020

(54) PROJECTION APPARATUS FOR MULTI-PROJECTION, COMMUNICATION APPARATUS, CONTROL METHODS THEREOF, STORAGE MEDIUM, AND PROJECTION SYSTEM

(71) Applicant: CANON KABUSHIKI KAISHA, Tokyo (JP)

(72) Inventor: Junji Kotani, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/188,780

(22) Filed: Nov. 13, 2018

(65) Prior Publication Data

US 2019/0149783 A1   May 16, 2019

(30) Foreign Application Priority Data

Nov. 16, 2017  (JP) .................................. 2017-221006

(51) Int. Cl.
| | |
|---|---|
| H04N 9/31 | (2006.01) |
| G03B 21/14 | (2006.01) |
| G03B 21/20 | (2006.01) |
| G03B 21/13 | (2006.01) |
| G03B 21/26 | (2006.01) |
| H04W 4/80 | (2018.01) |

(52) U.S. Cl.
CPC ........... *H04N 9/3147* (2013.01); *G03B 21/13* (2013.01); *G03B 21/147* (2013.01); *G03B 21/2053* (2013.01); *G03B 21/26* (2013.01); *H04W 4/80* (2018.02)

(58) Field of Classification Search
CPC .................................................... H04N 9/3147
USPC ..................................... 353/30, 94; 348/840
See application file for complete search history.

(56) References Cited

U.S. PATENT DOCUMENTS

| | | | |
|---|---|---|---|
| 10,373,589 B2* | 8/2019 | Ota ........................ | G09G 5/003 |
| 2014/0078399 A1* | 3/2014 | Frouin ................. | H01Q 25/005 |
| | | | 348/516 |

(Continued)

FOREIGN PATENT DOCUMENTS

| | | |
|---|---|---|
| JP | 2010-130539 A | 6/2010 |
| JP | 2013-117631 A | 6/2013 |

*Primary Examiner* — William C. Dowling
(74) *Attorney, Agent, or Firm* — Cowan, Liebowitz & Latman, P.C.

(57) ABSTRACT

A projection apparatus that projects one of a plurality of projection screens for an integrated screen, comprises: at least one processor or circuit to perform the operations of the following units: a first reception unit configured to receive, from other projection apparatus, notification indicating that the other projection apparatus joined a projection apparatus group by a first designation method that involves moving an external apparatus into proximity; and a control unit configured to control a display to display a projection apparatus list for setting the group by a second designation method that involves designating a projection apparatus from among a plurality of projection apparatuses, wherein the control unit controls the display to display the projection apparatus list in a manner in which projection apparatuses that joined the group by the first designation method are identifiable based on the notification.

16 Claims, 18 Drawing Sheets

(56) References Cited

U.S. PATENT DOCUMENTS

| | | | |
|---|---|---|---|
| 2016/0119507 A1* | 4/2016 | Duyvejonck | H04N 9/3147 |
| | | | 348/512 |
| 2016/0267878 A1* | 9/2016 | Maeda | H04N 9/3147 |
| 2016/0373703 A1* | 12/2016 | Ito | H04N 9/3147 |
| 2017/0118451 A1* | 4/2017 | Sakai | H04N 9/3147 |
| 2019/0155563 A1* | 5/2019 | Kotani | H04N 9/3185 |
| 2019/0286404 A1* | 9/2019 | Momose | G06F 3/1446 |

* cited by examiner

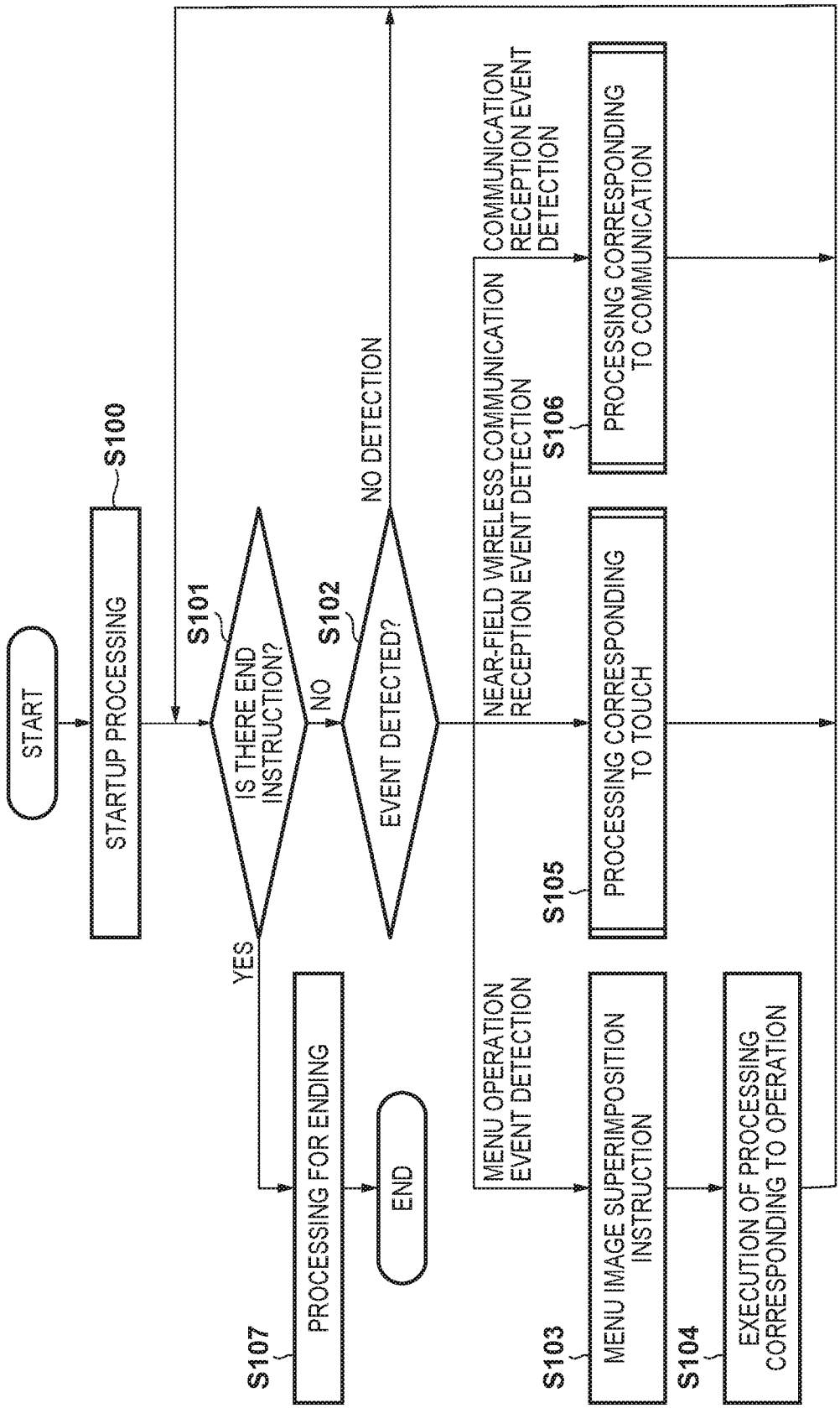

FIG. 6A

| SRC_ADDR | DEST_ADDR = broadcast | EXISTENCE INQUIRY |
|---|---|---|

FIG. 6B

| SRC_ADDR | DEST_ADDR | EXISTENCE RESPONSE | PRODUCT_TYPE |
|---|---|---|---|

FIG. 6C

| SRC_ADDR | DEST_ADDR | GROUP INCLUSION NOTIFICATION | GROUP_ID | TRUE or FALSE |
|---|---|---|---|---|

FIG. 6D

| SRC_ADDR | DEST_ADDR | LAYOUT SETTING INSTRUCTION | GROUP_ID | $NUM_H$ | $NUM_V$ | $POS_H$ | $POS_V$ | $EB_H$ | $EB_V$ |
|---|---|---|---|---|---|---|---|---|---|

FIG. 6E

| SRC_ADDR | DEST_ADDR = broadcast | MENU DISPLAY STATE INQUIRY |

FIG. 6F

| SRC_ADDR | DEST_ADDR | MENU DISPLAY STATE RESPONSE | MENU_STATE |

FIG. 6G

| SRC_ADDR | DEST_ADDR | TOUCH NOTIFICATION | TOUCH_ID |

FIG. 6H

| SRC_ADDR | DEST_ADDR | ACKNOWLEDG-MENT |

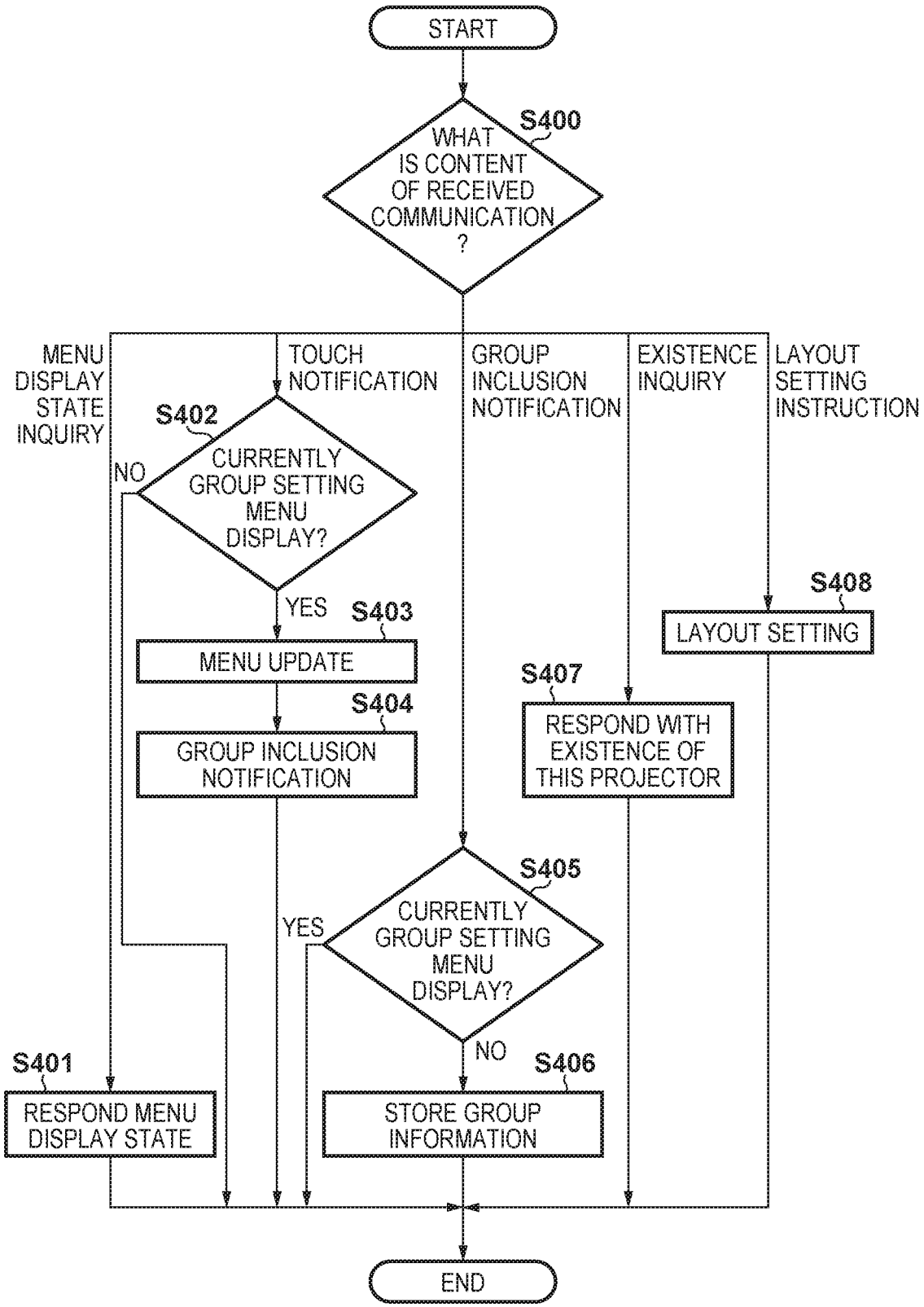

FIG. 10A

| | | MULTI-PROJECTION GROUP SETTING | | |
|---|---|---|---|---|
| 507 TOUCH | 508 SELECTION | 509 IP ADDRESS | 510 MODEL NUMBER | |
| ⚡ 1000a | ☑ | 192.168.100.20 | P-001 | (THIS PROJECTOR) |
| | ☑ | 192.168.100.21 | P-001 | |
| | ☐ | 192.168.100.22 | P-002 | |
| | ☐ | 192.168.100.23 | P-002 | |
| | ☑ | 192.168.100.24 | P-001 | |
| | ☐ | 192.168.100.25 | P-001 | |
| | ☐ | 192.168.100.26 | P-001 | |
| | ☐ | 192.168.100.27 | P-001 | |
| | ☐ | 192.168.100.28 | P-003 | |
| | ☐ | 192.168.100.29 | P-001 | |

FIG. 10B

| | | MULTI-PROJECTION GROUP SETTING | | |
|---|---|---|---|---|
| 507 TOUCH | 508 SELECTION | 509 IP ADDRESS | 510 MODEL NUMBER | |
| ⚡ 1000b1 | ☑ | 192.168.100.20 | P-001 | (THIS PROJECTOR) |
| | ☑ | 192.168.100.21 | P-001 | |
| | ☐ | 192.168.100.22 | P-002 | |
| | ☐ | 192.168.100.23 | P-002 | |
| 1000b2 | ☑ | 192.168.100.24 | P-001 | |
| 1000b3 | ☐ | 192.168.100.25 | P-001 | |
| ⚡ | ☑ | 192.168.100.26 | P-001 | |
| ⚡ | ☑ | 192.168.100.27 | P-001 | |
| ⚡ | ☑ | 192.168.100.28 | P-003 | |
| 1000b4 | ☐ | 192.168.100.29 | P-001 | |

FIG. 10C

| | | MULTI-PROJECTION GROUP SETTING | | |
|---|---|---|---|---|
| 507 TOUCH | 508 SELECTION | 509 IP ADDRESS | 510 MODEL NUMBER | |
| | ☑ | 192.168.100.20 | P-001 | (THIS PROJECTOR) |
| | ☑ | 192.168.100.21 | P-001 | |
| | ☐ | 192.168.100.22 | P-002 | |
| | ☐ | 192.168.100.23 | P-002 | |
| 1000b2 | ☑ | 192.168.100.24 | P-001 | |
| 1000b3 | ☐ | 192.168.100.25 | P-001 | |
| ⚡ | ☐ | 192.168.100.26 | P-001 | |
| ⚡ | ☐ | 192.168.100.27 | P-001 | |
| ⚡ | ☐ | 192.168.100.28 | P-003 | |
| 1000b4 | ☐ | 192.168.100.29 | P-001 | |

FIG. 13A

| | MULTI-PROJECTION GROUP SETTING | | | |
|---|---|---|---|---|
| TOUCH | SELECTION | IP ADDRESS | MODEL NUMBER | |
| ABC | ☑ | 192.168.100.20 | P-001 | (THIS PROJECTOR) |
| ABC | ☑ | 192.168.100.21 | P-001 | |
| DEF | ☐ | 192.168.100.22 | P-002 | |
| | ☐ | 192.168.100.23 | P-002 | |
| ABC | ☑ | 192.168.100.24 | P-001 | |
| | ☐ | 192.168.100.25 | P-001 | |
| ABC | ☑ | 192.168.100.26 | P-001 | |
| ABC | ☑ | 192.168.100.27 | P-001 | |
| ABC | ☑ | 192.168.100.28 | P-003 | |
| | ☐ | 192.168.100.29 | P-001 | |

1300a1 points to the first two ABC rows; 1300a1 points to the last three ABC rows.

FIG. 13B

| | MULTI-PROJECTION GROUP SETTING | | | |
|---|---|---|---|---|
| TOUCH | SELECTION | IP ADDRESS | MODEL NUMBER | |
| ∿ | ☑ | 192.168.100.20 | P-001 | (THIS PROJECTOR) |
| ∿ | ☑ | 192.168.100.21 | P-001 | |
| ∿ | ☑ | 192.168.100.24 | P-001 | |
| ∿ | ☑ | 192.168.100.26 | P-001 | |
| ∿ | ☑ | 192.168.100.27 | P-001 | |
| ∿ | ☑ | 192.168.100.28 | P-003 | |
| | ☐ | 192.168.100.22 | P-002 | |
| | ☐ | 192.168.100.23 | P-002 | |
| | ☐ | 192.168.100.25 | P-001 | |
| | ☐ | 192.168.100.29 | P-001 | |

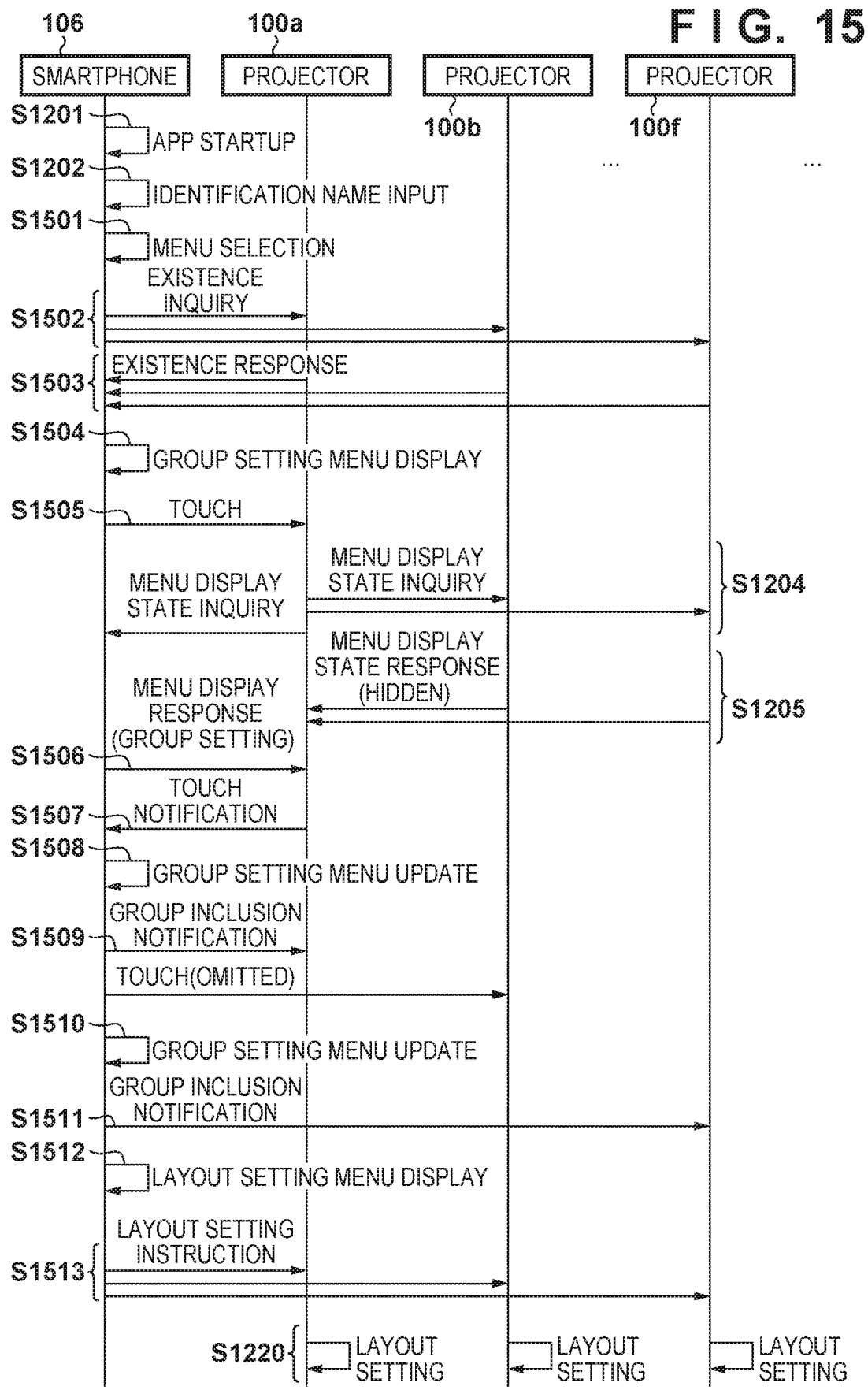

PROJECTION APPARATUS FOR MULTI-PROJECTION, COMMUNICATION APPARATUS, CONTROL METHODS THEREOF, STORAGE MEDIUM, AND PROJECTION SYSTEM

BACKGROUND OF THE INVENTION

Field of the Invention

The present invention relates to a projection apparatus, a communication apparatus, control methods thereof, a storage medium and a projection system, and more particularly relates to a technology that facilitates setting of multi-projection.

Description of the Related Art

Projection apparatuses that form an image on a light valve of a liquid crystal panel or the like and perform optically enlarged projection display of the formed image are known. Also, a mode called multi-projection for constituting a single large screen (integrated screen) by disposing a plurality of projection screens on a screen using a plurality of projection apparatuses is known.

In multi-projection, the user is required to carry out complex tasks such as preparing image data to be displayed and setting an area for overlap processing that is referred to as so-called edge blending, for example. Japanese Patent Laid-Open No. 2013-117631 discloses a technology for reducing the load on the user resulting from such tasks. Specifically, a predetermined projection apparatus calculates the number of pixels of the integrated screen with consideration for the number of pixels of the overlapping area of the respective projection screens, and notifies the calculated pixel count to a source device that provides image data. The projection apparatuses then each acquire the image data of the integrated screen from the source device, and clip and display their respective areas.

With multi-projection, the user also is required to specify the projection apparatuses that belong to the group constituting the multi-projection, in order to realize multi-projection with a plurality of apparatuses. This is all the more necessary in the case where the plurality of projection apparatuses are connected in a communication mode in which a large number of unspecified devices are connected, such as a network. Generally, as a method of specifying projection apparatuses constituting multi-projection, a method of selecting/setting information capable of specifying projection apparatuses, such as IP addresses, on a menu of a projection apparatus or the like is known, although such tasks are complex for the user, and can hardly be called intuitive.

On the other hand, Japanese Patent Laid-Open No. 2010-130539 discloses a technology for grouping mobile phones by allowing the user to touch a plurality of mobile phones together (so as to start near-field wireless communication), in order to easily specify apparatuses belonging to the group among a plurality of devices.

However, in the case of realizing multi-projection using a plurality of projection apparatuses, all of the projection apparatuses will not necessarily be installed within reach of the user, and there may, for example, also be projection apparatuses that are suspended in the air and the like. In the case where near-field wireless communication is applied to grouping of projection apparatuses, the group will include projection apparatuses grouped by a plurality of methods (method employing near-field wireless communication and other methods), and if these projection apparatuses are not distinguished, this conceivably complicates the task of selecting/setting projection apparatuses.

SUMMARY OF THE INVENTION

The present invention has been made in consideration of the aforementioned problems, and realizes a technology capable of easily ascertaining projection apparatuses constituting multi-projection.

In order to solve the aforementioned problems, one aspect of the present invention provides a projection apparatus that, in order to constitute an integrated screen obtained by combining a plurality of projection screens, projects one of the plurality of projection screens, comprising: at least one processor or circuit to perform the operations of the following units: a first reception unit configured to receive, from other projection apparatus, notification indicating that the other projection apparatus joined a projection apparatus group by a first designation method that involves moving an external apparatus into proximity, and a control unit configured to control a display to display a projection apparatus list for setting the projection apparatus group by a second designation method that involves designating a projection apparatus from among a plurality of projection apparatuses, wherein the control unit controls the display to display the projection apparatus list in a manner in which projection apparatuses that joined the group by the first designation method are identifiable based on the notification.

Another aspect of the present invention provides, a communication apparatus that communicates with a projection apparatus that, in order to constitute an integrated screen obtained by combining a plurality of projection screens, projects one of the plurality of projection screens, comprising: at least one processor or circuit to perform the operations of the following units: a first reception unit configured to receive, from the projection apparatus, notification indicating that the projection apparatus joined a projection apparatus group by a first designation method that involves moving the communication apparatus into proximity; and a control unit configured to control a display to display a projection apparatus list for setting the projection apparatus group by a second designation method that involves designating a projection apparatus from among a plurality of projection apparatuses, wherein the control unit controls the display to display the projection apparatus list in a manner in which projection apparatuses that joined the group by the first designation method are identifiable based on the notification.

Still another aspect of the present invention provides, a projection system comprising a projection apparatus that, in order to constitute an integrated screen obtained by combining a plurality of projection screens, projects one of the plurality of projection screens and a communication apparatus that communicates with the projection apparatus, the communication apparatus comprising: at least one processor or circuit to perform the operations of a communication unit that is configured to communicate with the projection apparatus via near-field wireless communication when the communication apparatus moves into proximity with the projection apparatus, and the projection apparatus comprising: at least one processor or circuit to perform the operations of the following units: a first reception unit configured to receive, from other projection apparatus, notification indicating that the other projection apparatus joined a projection apparatus group by a first designation method that involves moving the communication apparatus into proximity; and a control unit configured to control a display to display a projection apparatus list for setting the projection apparatus group by a second designation method that involves designating a projection apparatus from among a plurality of projection apparatuses, wherein the control unit controls the display to display the projection apparatus list in a manner in which projection apparatuses that joined the group by the first designation method are identifiable based on the notification.

Yet another aspect of the present invention provides, a control method of a projection apparatus that, in order to constitute an integrated screen obtained by combining a plurality of projection screens, projects one of the plurality of projection screens, the method comprising: receiving, from other projection apparatus, notification indicating that the other projection apparatus joined a projection apparatus group by a first designation method that involves moving an external apparatus into proximity; and controlling a display to display a projection apparatus list for setting the projection apparatus group by a second designation method that involves designating a projection apparatus from among a plurality of projection apparatuses, wherein, in the controlling, the display is controlled to display the projection apparatus list in a manner in which projection apparatuses that joined the group by the first designation method are identifiable based on the notification.

Still another aspect of the present invention provides, a non-transitory computer-readable storage medium storing a program for causing a computer to execute a control method of a projection apparatus, the method comprising: receiving, from other projection apparatus, notification indicating that the other projection apparatus joined a projection apparatus group by a first designation method that involves moving an external apparatus into proximity and controlling a display to display a projection apparatus list for setting the projection apparatus group by a second designation method that involves designating a projection apparatus from among a plurality of projection apparatuses, wherein, in the controlling, the display is controlled to display the projection apparatus list in a manner in which projection apparatuses that joined the group by the first designation method are identifiable based on the notification.

Yet another aspect of the present invention provides, a control method of a communication apparatus that communicates with a projection apparatus that, in order to constitute an integrated screen obtained by combining a plurality of projection screens, projects one of the plurality of projection screens, the method comprising: receiving, from the projection apparatus, notification indicating that the projection apparatus joined a projection apparatus group by a first designation method that involves moving the communication apparatus into proximity; and controlling a display to display a projection apparatus list for setting the projection apparatus group by a second designation method that involves designating a projection apparatus from among a plurality of projection apparatuses, wherein, in the controlling, the display is controlled to display the projection apparatus list in a manner in which projection apparatuses that joined the group by the first designation method are identifiable based on the notification.

Still another aspect of the present invention provides, a non-transitory computer-readable storage medium storing a program for causing a computer to execute a control method of a communication apparatus that communicates with a projection apparatus that, in order to constitute an integrated screen obtained by combining a plurality of projection screens, projects one of the plurality of projection screens, the method comprising: receiving, from the projection apparatus, notification indicating that the projection apparatus joined a projection apparatus group by a first designation method that involves moving the communication apparatus into proximity; and controlling a display to display a projection apparatus list for setting the projection apparatus group by a second designation method that involves designating a projection apparatus from among a plurality of projection apparatuses, wherein, in the controlling, the display is controlled to display the projection apparatus list in a manner in which projection apparatuses that joined the group by the first designation method are identifiable based on the notification.

According to the present invention, it becomes possible to easily ascertain projection apparatuses constituting multi-projection.

Further features of the present invention will become apparent from the following description of exemplary embodiments (with reference to the attached drawings).

BRIEF DESCRIPTION OF THE DRAWINGS

The accompanying drawings, that are incorporated in and constitute a part of the specification, illustrate embodiments of the invention, and together with the description, serve to explain the principles of the invention.

FIG. 4 is a flowchart showing a series of operations related to basic operations by a projector in the first embodiment.

FIGS. 6A to 6H are diagrams for describing the format of communication in the first embodiment.

FIGS. 9A and 9B are flowcharts showing a series of operations by the projector in the first embodiment.

FIGS. 10A to 10C are diagrams for describing menus in the first embodiment.

FIGS. 13A and 13B are diagrams for describing a menu in the first embodiment.

FIG. 15 is a diagram for describing a sequence in the second embodiment.

DESCRIPTION OF THE EMBODIMENTS

First Embodiment

Figure 1:
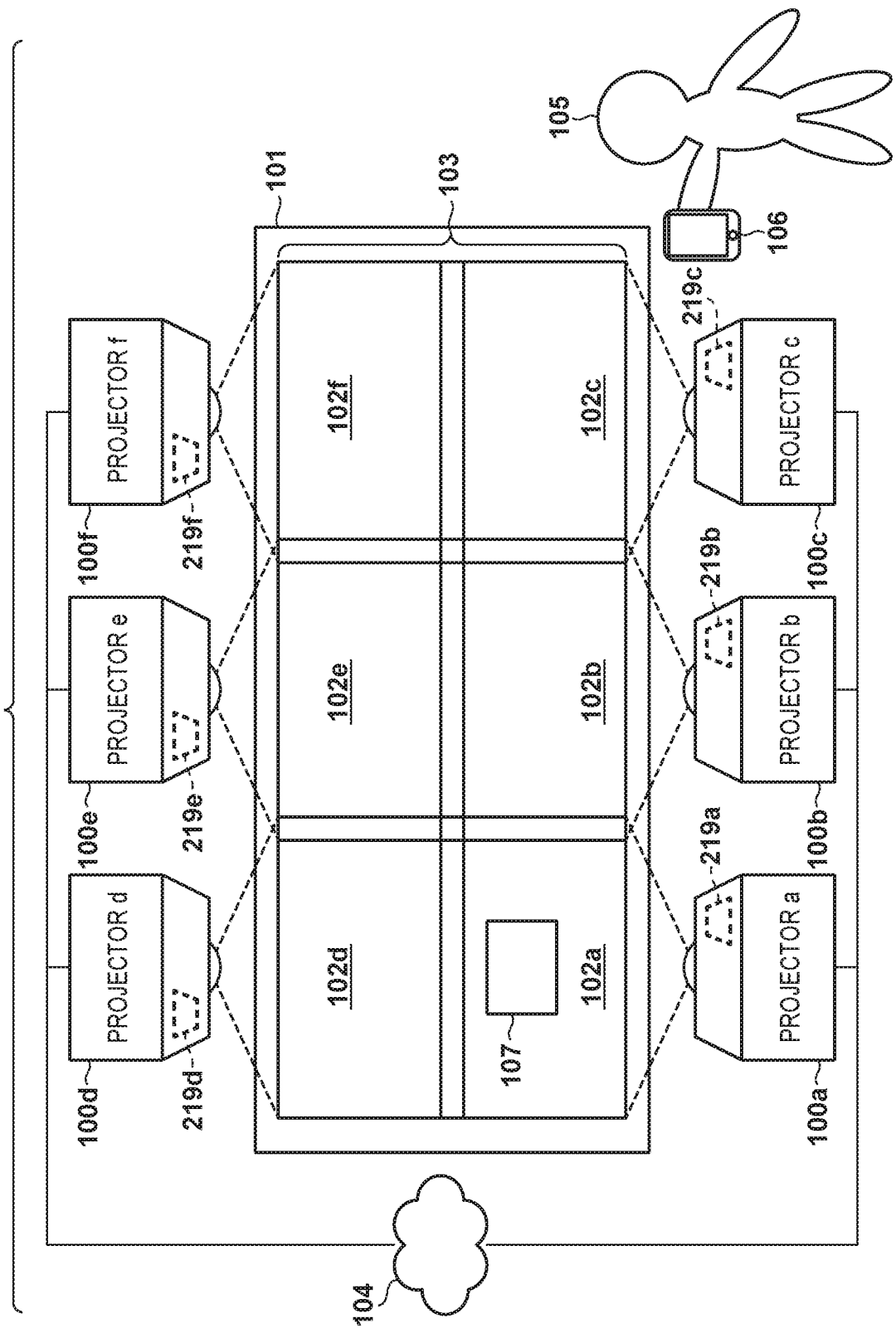
FIG. 1 is a diagram illustrating an example of a projection system in a first embodiment.

Hereinafter, illustrative embodiments of the present invention will be described in detail, with reference to drawings. A system according to the present embodiment is a multi-projection system that includes projectors serving as an example of a projection apparatus and a smartphone serving as an example of a communication apparatus. In the following description, an example of a system that is constituted by six projectors and one smartphone will be described, but the present invention is applicable provided there are two or more projectors. Note that the projection apparatus according to the present embodiment is applicable not only to a projector but also to other devices that are capable of projection. These devices include digital cameras, game machines, tablet terminals, medical devices, devices of in-vehicle systems and the like that are provided with a projection unit, for example. Also, the communication apparatus according to the present embodiment is applicable not only to a smartphone but also to other devices capable of communicating with a projection apparatus. These devices may include digital cameras, game machines, tablet terminals, wearable terminals such as watch-type and glasses-type terminals, medical devices, devices of in-vehicle systems and the like that are provided with a near-field wireless communication function, for example.

Overall Configuration

First, the overall configuration of a multi-projection system according to the present embodiment will be described, with reference to FIG. 1. The multi-projection system according to the present embodiment forms a large wide screen that is three screens wide and two screens tall using six projectors, for example.

Reference numerals 100a to 100f denote the projectors. The projectors 100a to 100f respectively project input image signals optically, and display images on a screen 101 as projection screens 102a to 102f. A single integrated content can be displayed as a result of the projection screens 102a to 102f constituting partial areas of an integrated screen 103. The projectors 100a to 100f are connected to a network 104, and can communicate with each other. Also, the projectors 100a to 100f acquire image data for projecting, from a server or the like, which is not shown, through the network 104. Note that image data may be acquired by methods other than through the network 104, and image data may be respectively acquired from a signal source, which is not shown, via video cables, for example. The user 105 possesses a smartphone 106. The smartphone 106 will be described in detail later. The projectors 100a to 100f respectively have near-field wireless communication units 219a to 219f and communication is possible between the smartphone 106 and the projector 100, by the smartphone 106 being held up close to or touched to the projectors. Note that, in order to facilitate description, "being held up close to" or "touched to" will be collectively referred to below as "touching to". The near-field wireless communication units 219a to 219f will be described in detail later.

Here, in the multi-projection system, settings such as the display area and the width of the overlapping area need to be configured, in order to integrate the projection screens 102a to 102f and form the integrated screen 103 so as to appear as one display screen. In the present embodiment, these settings are thus configured using a menu image 107 that is displayed by one of the projectors, for example (described in detail later).

Note that since the projectors 100a to 100f have many points in common, and the suffixes a to f will be omitted in the following description, in the case of describing common features. In the case of describing the projectors individually, the suffixes a to f will be included in the description.

Functional Configuration of Projector

Figure 2:
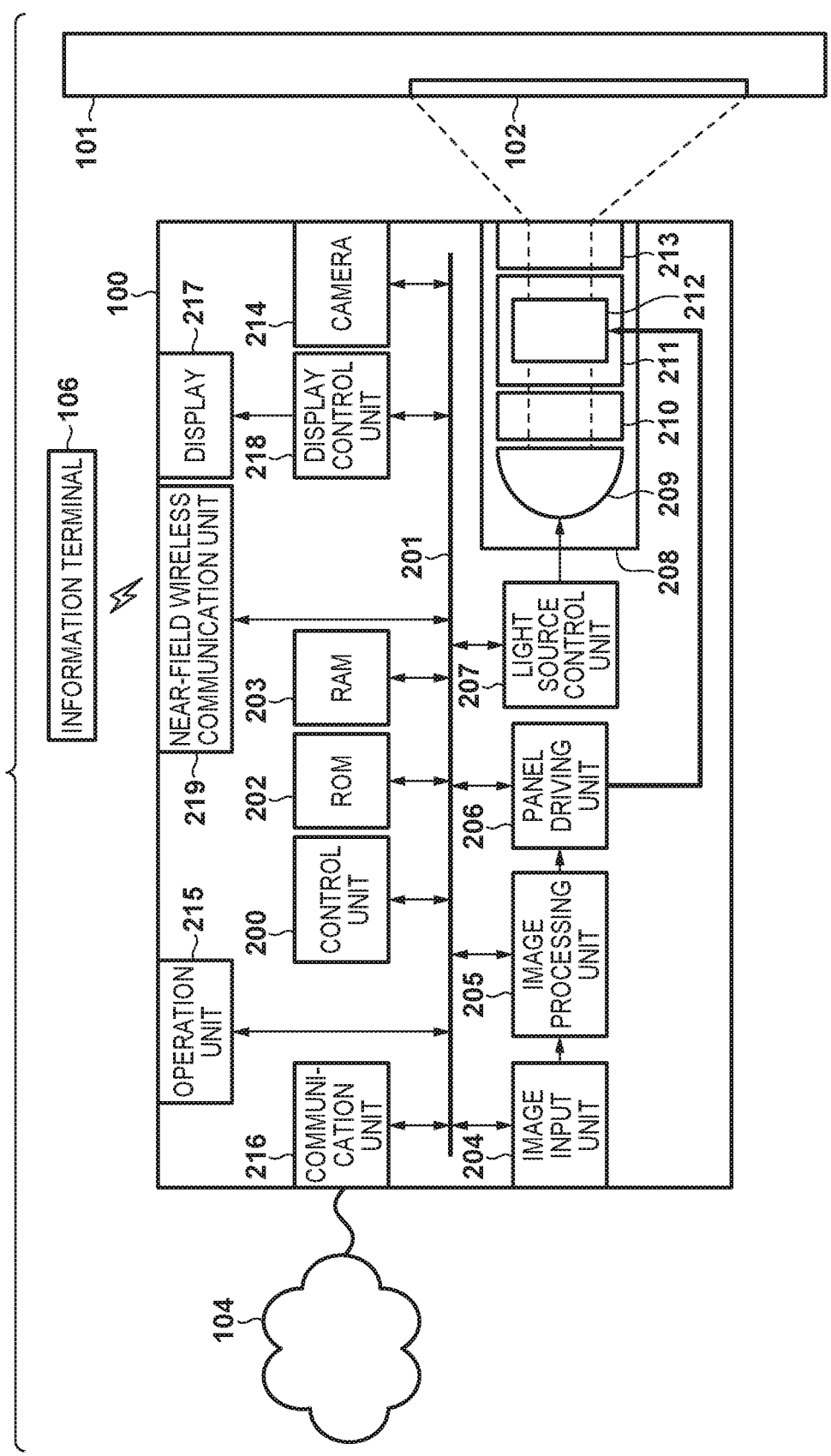
FIG. 2 is a block diagram showing an exemplary functional configuration of the projector in the first embodiment.

Next, an exemplary functional configuration of the projector 100 will be described, with reference to FIG. 2. FIG. 2 shows a block configuration of the functions of the projector 100.

Reference numeral 200 denotes a control unit. The control unit 200 includes a processor of a CPU (or MPU, GPU, etc.), for example, and controls the overall operations of the projector 100, by extracting a program stored in a ROM 202 to a RAM 203 and executing the program. Also, the control unit 200 executes processing according to the present embodiment which will be described later, by executing the program.

Reference numeral 201 denotes a bus. The control unit 200 is capable of communicating with the units within the projector 100 via the bus 201. Reference numeral 202 denotes a ROM. The ROM 202 is a nonvolatile memory, and stores a program for the control unit 200 to perform operations and data required in order for the projector 100 to perform operations. Reference numeral 203 denotes a RAM. The RAM 203 is a volatile memory and is used as a work memory for the control unit 200 to perform operations.

Reference numeral 204 denotes an image input unit. The image input unit 204 inputs image data from an external device such as a personal computer, which is not shown, converts the image data into a form that can be a processed by downstream circuits, and output the resultant data to an image processing unit 205.

Reference numeral 205 denotes an image processing unit. The image processing unit 205 performs image quality correction such as brightness correction, black level correction, color correction, color conversion and gamma correction, enlargement and reduction, frame rate conversion, and distortion correction such as keystone correction and freeform surface correction on input image data, in accordance with instructions from the control unit 200. The image processing unit 205 is able to perform illumination reduction processing (so-called edge blending processing) on the area that overlaps with the projection screens of other projectors in order to perform multi-projection. Also, the image processing unit 205 is able to superimpose and display images designated by the control unit 200 on the input image data, in accordance with instructions from the control unit 200. A menu image for prompting a user operation can thereby also be displayed in a superimposed manner. The image processing unit 205 outputs the processed image data to a panel driving unit 206 described below.

Reference numeral 206 denotes a panel driving unit. The panel driving unit 206 performs gradation conversion on the input image data, such that the degree of light modulation in the panel becomes linear to the gradations. Also, the panel driving unit 206 converts the image data after conversion into a drive signal for forming an image on a liquid crystal panel 212 described later, and outputs the drive signal to the liquid crystal panel 212. Reference numeral 207 denotes a light source control unit. The light source control unit 207 performs control such as turning a light source 209 on and off and changing the luminance in response to instructions from the control unit 200.

Reference numeral 208 denotes an optical system. The optical system 208 includes the light source 209, an illumination optical system 210, a color separation and synthesis optical system 211, the liquid crystal panel 212, and a projection optical system 213 described in detail later. As a result of the optical system 208, light from the light source 209 is modulated in the liquid crystal panel 212 and projected outside of the projector 100 and an image is displayed on the screen 101.

Reference numeral 209 denotes a light source. A high-pressure mercury lamp, a halogen lamp, an LED (light-emitting diode) or a laser light source can be used for the light source 209. The light source 209 may employ a white light source, and may be configured so as to consist of a plurality of light sources for each of color components R (Red), G (Green), and B (Blue). Alternatively, the light source 209 may be constituted by a light source for B and phosphors that converts B light into Y (Yellow) light. Reference numeral 210 denotes an illumination optical system. The illumination optical system 210 is constituted by a plurality of lenses, and is for homogenizing and collimating the light from the light source 209 and illuminating the liquid crystal panel 212 described later with the resultant light. Reference numeral 211 denotes a color separation and synthesis optical system. The color separation and synthesis optical system 211 includes the liquid crystal panel 212 described later. The color separation and synthesis optical system 211 separates the light from the illumination optical system 210 into red, blue and green light, and irradiate the liquid crystal panel 212 with the resultant light. Also, light of each color output from the liquid crystal panel 212 is synthesized and output to the projection optical system 213. Reference numeral 212 denotes a liquid crystal panel. An image is formed on the liquid crystal panel 212 by the drive signal generated by the panel driving unit 206. A transmissive liquid crystal panel or a reflective liquid crystal panel can be used as the liquid crystal panel 212. Reference numeral 213 denotes a projection optical system. The projection optical system 213 is constituted by lenses and the like that externally project light irradiated by the light source 209 and modulated by the liquid crystal panel 212.

Note that the optical system 208 may be transformed in various modes. For example, if the light source 209 is provided for each color, an optical system for color separation is not required. Also, if the liquid crystal panel 212 is a single panel and is configured to output the respective colors in a time division manner, an optical system for color synthesis is not required. Also, a configuration may be adopted in which the liquid crystal panel 212 is not provided, and the projection screen 102 is displayed by scanning a spot light modulated according to the image data over the screen 101. As in these configurations, the present embodiment is applicable as long as an optical system is provided that is able to modulate light based on image data received from an external device and to project images.

Reference numeral 214 denotes a camera. The camera 214 captures an image of the projection screen 102 on the screen 101, in accordance with an instruction from the control unit 200, and transmits the captured image data to the control unit 200. Reference numeral 215 denotes an operation unit. The operation unit 215 includes buttons, a touch screen or the like for receiving instructions from a user. The operation unit 215 is able to receive user operations such as power on and off instructions, instructions relating to image processing, and instructions relating to operations on a menu, for example. Also, the operation unit 215 is given as including a light-reception unit for receiving infrared light or the like, and may be configured so as to receive user instructions from a remote controller, which is not shown.

Reference numeral 216 denotes a communication unit. The communication unit 216 is constituted by a module that performs wired communication and a module that performs wireless communication. The communication unit 216 enables transmission and reception of command data and image data to and from an external device. For example, commands equivalent to instructions from a user that are received by the operation unit 215 can also be received through the communication unit 216. A controller for communication (and an antenna) that complies with standards such as USB (Universal Serial Bus), Ethernet®, wireless LAN and Bluetooth® can be used as the communication unit 216.

Reference numeral 217 denotes a display unit. The display unit 217 is controlled by the display control unit 218 described below, and is able to display images in accordance with instructions from the control unit 200. As the display unit 217, a liquid crystal panel, an organic EL panel, electronic paper and the like can be used, for example. Reference numeral 218 denotes a display control unit. The display control unit 218 includes a circuit for controlling the display unit 217 in response to instructions from the control unit 200.

Reference numeral 219 denotes a near-field wireless communication unit. The near-field wireless communication unit 219 is a module for performing communication that is based on communication protocols complying with standards for near-field wireless communication such as ISO/IEC 14443 and ISO/IEC 18092, for example, and includes an antenna, a communication controller and the like. The control unit 200 is capable of communicating, through the near-field wireless communication unit 219, with external devices such as the smartphone 106 that are touched to the near-field wireless communication unit 219. The near-field wireless communication unit 219 may be configured so as to use methods of other communication standards, and may use any method that is able to detect that an external device such as the smartphone 106 is being physically held up close thereto or being touched thereto.

Detailed Configuration of Smartphone

Figure 3:
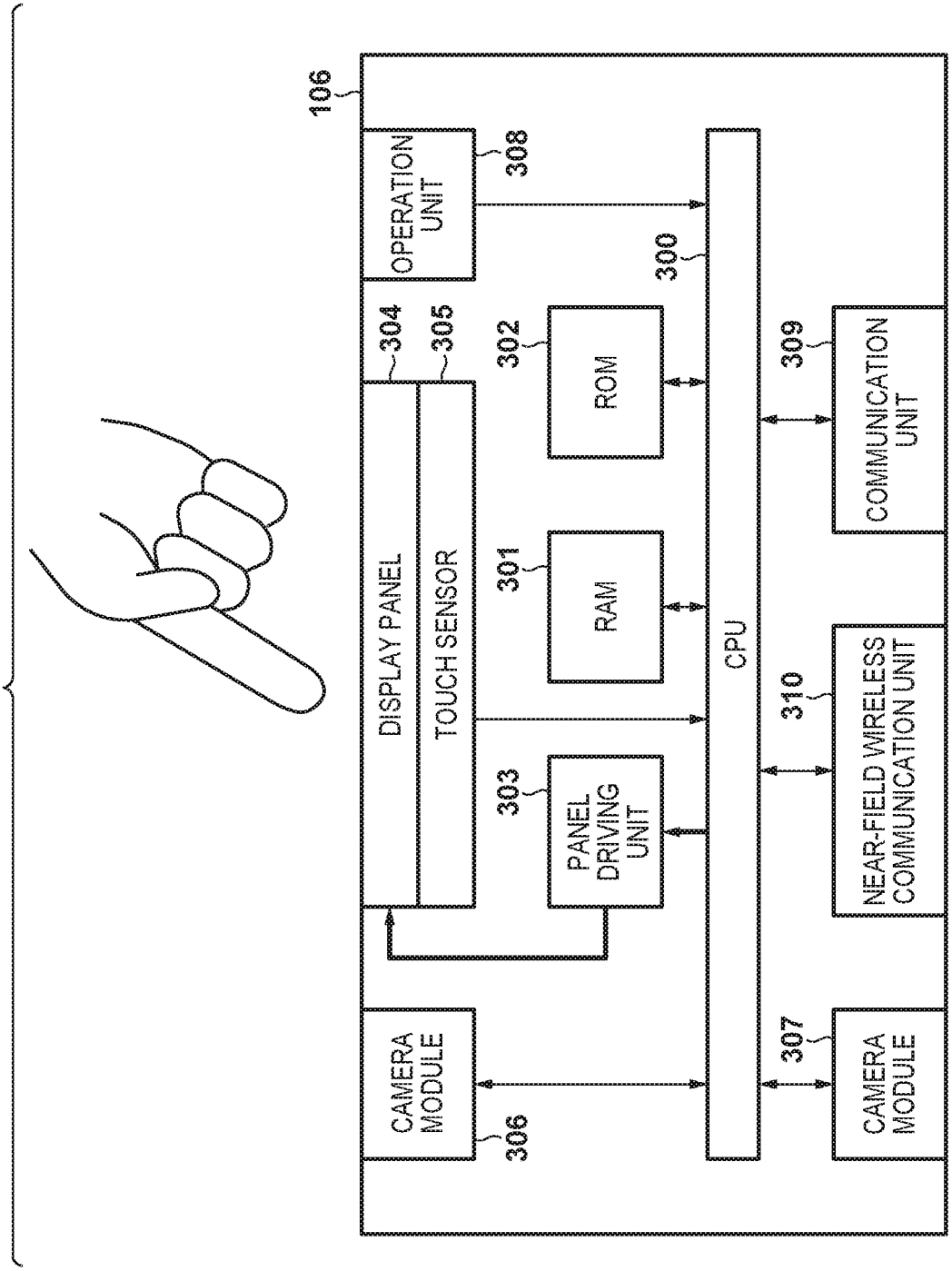
FIG. 3 is a block diagram showing an exemplary functional configuration of a smartphone in the first embodiment.

Next, the functional configuration of the smartphone 106 will be described, with reference to FIG. 3.

Reference numeral 300 denotes a CPU. The CPU 300 includes a processor, and performs overall controls of the smartphone 106, by extracting a program recorded on a ROM 302 to a RAM 301 and executing the program. Reference numeral 301 denotes a RAM. The RAM 301 is a volatile memory and functions as a work memory for the CPU 300 to perform operations. Reference numeral 302 denotes a ROM. The ROM 302 is a nonvolatile memory and is used in order to store various data. Stored data includes an OS (Operating System) for the CPU 300 to perform operations, program code for applications, data that is used when executing the OS and program code, and multimedia content.

Reference numeral 303 denotes a panel driving unit. The panel driving unit 303 displays images on a display panel 304 described later, based on instructions from the CPU 300. Reference numeral 304 denotes a display panel. The display panel 304 is for presenting images to a user, and a liquid crystal panel, an organic EL panel, electronic paper or the like, for example, can be used therefor. Reference numeral 305 denotes a touch sensor. The touch sensor 305 detects touching of a finger or a stylus on the display panel 304 by a user. The touch sensor 305 calculates information such as whether or not the display panel 304 has been touched and a touch position, and transmits the information to the CPU 300. The CPU 300 is thereby able to calculate the position touched by a user operation in the coordinate system of the display panel 304. Through such touch inputs, the user operates the smartphone 106. A sensor employing a capacitive sensing method or a pressure-sensitive sensor, for example, can be used as the touch sensor 305.

Reference numeral 306 denotes a camera module. The camera module 306 captures an image of the front surface (display panel 304 side) of the smartphone 106 in accordance with an instruction from the CPU 300, and transmits the captured image to the CPU 300. Reference numeral 307 denotes a camera module. The camera module 307 captures an image of the back surface (opposite side to the display panel 304) of the smartphone 106 in accordance with an instruction from the CPU 300, and transmits the captured image to the CPU 300.

Reference numeral 308 denotes an operation unit. The operation unit 308 is an operation member such as a button for receiving instructions from a user. The operation unit 308 is able to receive instructions from a user such as power on and off instructions and instructions for switching applications to be operated, for example.

Reference numeral 309 denotes a communication unit. The communication unit 309 is constituted by a module that performs wired communication and a module that performs wireless communication. The communication unit 309 enables transmission and reception of control data, image data, multimedia data and hypertext data with external devices, and acquisition of application code from external devices. A controller for communication (and an antenna) for communication by USB (Universal Serial Bus), Ethernet®, wireless LAN, Bluetooth® or the like can be used as the communication unit 309.

Reference numeral 310 denotes a near-field wireless communication unit. The near-field wireless communication unit 310 is a module for performing communication that is based on communication protocols complying with standards for near-field wireless communication such as ISO/IEC 14443 and ISO/IEC 18092, for example, and consists of an antenna, a communication controller and the like. The CPU 300 is capable of communicating, through the near-field wireless communication unit 310, with external devices that support the near-field wireless communication of the projector 100 and the like.

Series of Operations Related to Basic Operations of Projector

Next, a series of operations related to basic operations of the projector will be described, with reference to FIG. 4. Note that this processing is realized by the control unit 200 extracting a program stored in the ROM 202 to the work area of the RAM 203 and executing the program, and also controlling units such as the panel driving unit 206. When AC power is supplied to the projector 100 with a power cable, which is not shown, power is supplied to the control unit 200, the bus 201, the ROM 202, the RAM 203, the communication unit 216 and the operation unit 215, and the control unit 200 starts up and enters a standby state. Here, the control unit 200, upon detecting receipt of a power on instruction from the user via the operation unit 215 or the communication unit 216, transitions to a projecting state, and starts this processing.

In step S100, the control unit 200 executes startup processing. For example, the control unit 200 performs control to supply power to the units of the projector 100, and configures settings such that the image input unit 204, the image processing unit 205, the panel driving unit 206, the light source control unit 207 and the camera 214 are operable. Also, the control unit 200 instructs the light source control unit 207 to cause the light source 209 to emit light and operates a cooling fan, which is not shown. The projector 100 thereby starts projection display of image data that is received from the image input unit 204 or the communication unit 216. Note that the control unit 200 may control the image processing unit 205 to perform menu display and image quality correction, based on commands or the like that are received through the communication unit 216 or the operation unit 215.

In step S101, the control unit 20X) determines whether an end instruction from the user has been accepted. The control unit 200, in the case where a power off instruction from the user is received via the operation unit 215 or the communication unit 216, for example, determines that an end instruction has been accepted and advances to step S107. On the other hand, the control unit 200, in the case where a power off instruction is not received (in a predetermined period), determines that a power off instruction from the user has not been received, and advances to step S102.

In step S102, the control unit 200 determines whether an event that affects the behavior of the projector 100 was detected. The control unit 200, in the case where the detected event is an operation on a menu described later, such as an operation by the user via the operation unit 215, advances the processing to step S103. Also, the control unit 200, in the case where the detected event is a touch operation of the smartphone 106 for near-field wireless communication via the near-field wireless communication unit 219, advances the processing to step S105. Furthermore, the control unit 200, in the case where the detected event is reception of communication via the communication unit 216, advances the processing to step S106. If an event is not detected, the processing returns to step S101.

In step S103, the control unit 200 instructs the image processing unit 205 to superimpose a menu image, according to the operation detected in step S102. The control unit 200 displays three types of menus, for example, as an example of menu screens. That is, there are four menu display states when the state where the menus are hidden is included. Processing that is based on the menu display operation differs, according to each of these menu display states. The menu display states will be described with reference to the exemplary menu images in FIGS. 5A to 5C.

First Display State: Menu Hidden State

The first state is a state in which the menus are hidden. When in the menu hidden state, a menu image is not superimposed on the projection screen. If, in the menu hidden state, there is a menu display operation (event detected in step S102) via the operation unit 215, the control unit 200 instructs the image processing unit 205 to superimpose a menu image 500 described later (in step S103). The menu display state thereby enters a main menu display state described below.

Second State: Main Menu Display State

The second state is a main menu display state. In this case, the control unit 200 displays the menu image 500 shown in FIG. 5A, for example, in a superimposed manner. The menu image 500 includes items 501 to 504. The item 501 is a setting item for adjusting the brightness of the projection screen 102. The item 502 is a setting item for adjusting the contrast of the projection screen 102. The item 503 is a selection item for displaying a group setting menu described later. The item 504 is a selection item for displaying a layout setting menu described later.

The control unit 200, in the case where, in the main menu display state, there is an operation (event detected in step S102) changing the setting values of the setting items, instructs the image processing unit 205 in step S103 to change the superimposed image so as to present the changed setting values.

The control unit 200, in the case where there is a menu hide operation (event detected in step S102), instructs the image processing unit 205 in step S103 to end the superimposed display. The menu display state will thereby enter the hidden state.

Figure 5A:
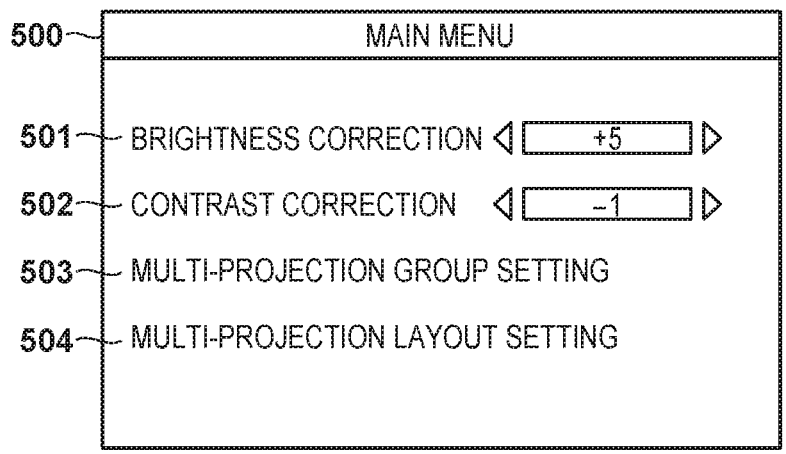
FIGS. 5A to 5C are diagrams for describing menus in the first embodiment.

The control unit 200, in the case where there is an operation (event detected in step S102) selecting the item 503, in the state in which the menu image of FIG. 5A is displayed, instructs the image processing unit 205 in step S103 to superimpose a menu image 505 described later. The menu display state thereby enters a group setting menu display state described later.

The control unit 200, in the case where there is an operation (event detected in step S102) selecting the item 504, in the state in which the menu image of FIG. 5A is displayed, instructs the image processing unit 205 in step S103 to superimpose a menu image 511 described later. The menu display state thereby enters a layout setting menu display state described later.

Third State: Group Setting Menu Display State

Figure 5B:
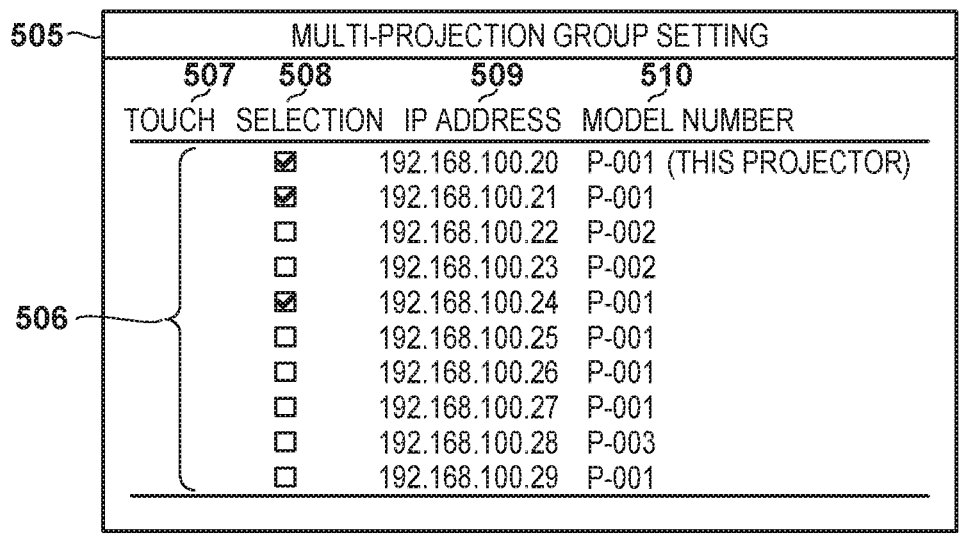
Figure 5C:
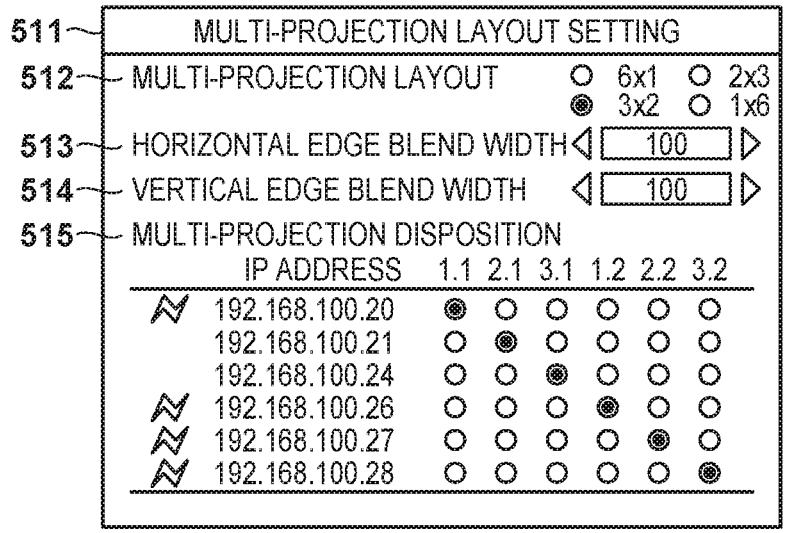

The third state is a group setting menu display state. In this state, an instruction is given to superimpose the menu image 505 shown in FIG. 5B, for example. A table 506 (i.e., list of projectors) that enumerates the projectors connected to the network 104 is included in the menu image 505. The table 506 has a column 507 for indicating whether or not the projectors have been touched, a column 508 for selecting projectors as a group for multi-projection, a column 509 for displaying addresses, and a column 510 for displaying the model numbers of projectors, and the lines correspond to the individual projectors. Note that the column 508 shows those projectors touched via near-field wireless communication by the smartphone 106, that is, the projectors constituting the multi-projection group. In the example of FIG. 5B, an icon is added to the projectors touched via near-field wireless communication. A detailed description of display will be given later but, in the example of FIG. 5B, the column 508 is in the form of checkboxes, and projectors that have been checked are indicated as constituting the multi-projection group. Note that the initial line of the table 506 shows information on the projector in which the table is being displayed.

The control unit 200, in the case of displaying the menu image 505 in a superimposed manner in step S103, needs to obtain information corresponding to the table 506 immediately before the menu image is displayed. The control unit 200 transmits an inquiry (existence inquiry signal) for acquiring information on the projectors constituting the group to the devices connected to the network 104 via the communication unit 216. The existence inquiry signal is formatted as shown in FIG. 6A, and is constituted by three fields. The first field is a source address SRC_ADDR on the network, and the address of the projector that sends the existence inquiry signal is stored. The second field is a destination address DEST_ADDR on the network. In the above existence inquiry signal, a special address for broadcasting is stored, in order to set all of the devices on the network as inquiry targets. The third field is data indicating the current communication contents, and an identifier showing "existence inquiry" is stored as an example of the existence inquiry signal.

In the case where a projector transmits an existence inquiry signal, the other projectors connected to the network 104 send back a response in the format shown in FIG. 6B upon receiving this existence inquiry signal. This format is constituted by four fields. The first field is a source address SRC_ADDR on the network, and stores the address of projectors that transmits the response. The second field is a destination address DEST_ADDR on the network, and stores the address (SRC_ADDR of the packet of FIG. 6A) of the projector that transmitted the packet of FIG. 6A. The third field is data indicating the current communication contents, and is an identifier indicating "existence response". The fourth field is PRODUCT TYPE which is model number information of a projector, and stores the model number information on other projectors that are a transmission source. The control unit 200 of the projector that transmitted the existence inquiry signal is able to obtain a list of the projectors, by enumerating the response data of FIG. 6B that was sent back and adding similar data of its own projector at the head of the response data.

Assume that there was an operation (event detected in step S102) adding projectors corresponding to respective lines of the table 506 to the multi-projection group, when the multi-projection group setting menu screen is being displayed. In this case, the control unit 200, in step S103, instructs the image processing unit 205 to change the superimposed image so that the column 508 of the corresponding lines is checked (so that a checkmark is displayed in the column 508 of the corresponding lines).

Also, assume that there was an operation (event detected in step S102) indicating to remove projectors corresponding to respective lines of the table 506 from the multi-projection group, when the menu screen of multi-projection group setting is being displayed. In this case, the control unit 200, in step S103, instructs the image processing unit 205 to change the superimposed image so that the column 508 of the corresponding lines is unchecked.

Furthermore, in the case where there is a setting completion operation (event detected in step S102), in the state in which the multi-projection group setting menu image is displayed, the control unit 200, in step S103, instructs the image processing unit 205 to end the superimposed display. The menu display state thereby enters the hidden state.

Fourth State: Layout Setting Menu Display State

The fourth state is a layout setting menu display state. As a result of the item 504 being selected in the state in which the menu image of FIG. 5A is displayed, the menu display state transitions to this state. In this state, an instruction is given to superimpose the menu image 511 of FIG. 5C, for example.

The menu image 511 includes a setting item 512 for setting the multi-projection layout. The setting item 512 is displayed such that possible layouts can be selected, based on the projectors selected on the menu image 505 (i.e., the projectors included in the multi-projection group). In the example of the menu image 511, in the case where six projectors have been selected in the menu image 505, the layouts 6×1, 2×3, 3×2 and 1×6, which are the possible layouts with six projectors, are presented as selection options. Note that these numeric values indicate the number of horizontal projectors times the number of vertical projectors.

The menu image 511 includes a setting item 513 and a setting item 514 for setting the horizontal and vertical widths of the edge blend in the multi-projection layout, and also includes a setting item 515 for setting the disposition of the projector in the multi-projection layout. In the setting item 515, the correspondence relationships between IP addresses identifying the individual projectors 100 and positions in the layout (shown in the form "horizontal position, vertical position") are selectably displayed. In the setting item 515, the icons added at the head of the addresses will be described later.

In the case where there is an operation (event detected in step S102) changing setting values of respective setting items, in the state in which the layout setting menu image is being displayed, the control unit 200, in step S103, instructs the image processing unit 205 to change the superimposed image so as to present the changed settings.

In the case where there is a setting completion operation (event detected in step S102), in the state in which the layout setting menu image is being displayed, the control unit 200, in step S103, instructs the image processing unit 205 to end the superimposed display. The menu display state thereby enters the hidden state.

In step S104, the control unit 200 executes processing corresponding to the operation carried out in step S103, according to the result of step S103. Hereinafter, this will be described in detail.

In the case where, in the menu image 500, a brightness correction setting of the item 501 or a contrast correction setting of the item 502 is configured by a user operation, the control unit 200 gives an instruction corresponding to the respective setting to the image processing unit 205.

When a checkbox of the column 508 of the table 506 is changed by the user to a checked state in the menu image 505, the control unit 200 notifies the corresponding projector 100 about having been included in the multi-projection group, via the communication unit 216. This notification is formatted as shown in FIG. 6C. This format consists of five fields. The first field is a source address SRC_ADDR on the network, and stores the address of the projector that is the transmission source that sends the notification. The second field is a destination address DEST_ADDR on the network, and stores the address of the projector corresponding to the changed checkbox. The third field is data indicating the current communication contents, and is an identifier indicating "group inclusion notification". The fourth field is a group identifier GROUP_ID that is randomly decided every time the control unit 200 is started up, and stores a numerical value that is immutable while the control unit is operating. This identifier prevents interference between group settings in the case where similar settings are configured at the same time on other projectors connected to the network 104. The fifth field is data indicating the polarity of group inclusion, and stores one of TRUE indicating inclusion in the group (applies to the case where the checkbox is checked) and FALSE indicating withdrawal from the group (applies to the case where the checkbox is unchecked). Note that GROUP_ID may be acquired by a method other than being generated as a random number. For example, a value designated with user input may be set. An ID or address unique to the processor may also be used, for example. That is, the group identifier may be acquired by any method, as long as an identifier that is able to distinguish unrelated multi-projection setting that is performed with a similar protocol at the same time in other devices is obtained. A projector that receives this notification sends back a response in the format shown in FIG. 6H. This response indicates that the current notification was received normally. This format consists of three fields. The first field is a source address SRC_ADDR on the network, and stores the address of the projector that is the transmission source that transmitted the response. The second field is a destination address DEST_ADDR on the network, and stores the address of the projector that is the transmission destination to which the response is transmitted (projector that transmitted the notification). The third field is an identifier indicating "acknowledgment". The control unit 200 of the projector that is the transmission source of the notification (transmission destination of the response) confirms that notification has been completed by receiving this response, via the communication unit 216.

In the case where each of the setting items 512 to 515 is configured in the menu image 511, the control unit 200 notifies the projectors that are included in the multi-projection group selected in the menu image 505, via the communication unit 216. This notification consists often fields, as shown in FIG. 6D. The first field is a source address SRC_ADDR on the network, and stores the address of the projector that is the transmission source that sends the notification. The second field is a destination address DEST_ADDR on the network, and stores the address of projectors corresponding to changed settings. The third field is data indicating the current communication contents, and is an identifier indicating "layout setting instruction". The fourth field is the aforementioned group identifier GROUP_ID. A fifth field $NUM_H$ and a sixth field $NUM_V$ store the horizontal and vertical number of projectors for multi-projection set in the setting item 512. A seventh field $POS_H$ and an eighth field $POS_V$ store the horizontal and vertical positions in the multi-projection layout of target projectors set in the setting item 515. A ninth field $EB_H$ and a tenth field $EB_V$ store the horizontal and vertical widths of the edge blend set in the setting item 513 and the setting item 514. Note that this notification is also implemented to the projector that sent this notification. The projectors that receive this notification send back a response in the format shown in FIG. 6H. This response indicates that the current notification was received normally, as described above. The control unit 200 of the projector that is the transmission source of the notification (transmission destination of the response) confirms that notification has been completed by receiving this response via the communication unit 216. The control unit 200 returns to step S101 when the processing of step S104 has been completed.

In step S105, the control unit 200 performs processing corresponding to the smartphone 106 having been touched to the projector (i.e., processing that facilitates multi-projection group setting). Specific processing will be described later.

In step S106, the control unit 200 performs processing that is based on communication received via the communication unit 216. The specific contents of the processing will also be described later.

On the other hand, in step S107, the control unit 200 performs end processing of the units of the projector 100 (since an end instruction was received in step S101). The control unit 200 performs control to stop power supply to the units, and the control unit 200 again enters the standby state.

Series of Operations Related to Basic Operations of Smartphone

Next, a series of operations related to basic operations of the smartphone 106 will be described. The smartphone 106 operates with power from a battery, which is not shown. When power from the battery, which is not shown, is supplied, the CPU 300 starts up and enters the standby state. Here, when a startup instruction from the user is input via the operation unit 308, the CPU 300 reads out instruction code of an OS and data required for operations from the ROM 302, starts operation of the OS, and causes the display panel 304 to perform corresponding display. Also, applications are stored in advance in the ROM 302. The CPU 300 specifies an application to be started up, in accordance with an instruction from the user input via the operation unit 308 or the touch sensor 305, and loads and starts up the application. Thereafter, the CPU 300 operates in accordance with the code of the application. Also, the CPU 300 ends the application, in accordance with an instruction from the user input via the operation unit 308 or the touch sensor 305. Also, when a shutdown instruction from the user is given via the operation unit 308, the OS is shut down, and the CPU 300 returns to the standby state.

Series of Operations Related to Touch Processing in Smartphone

Figure 7:
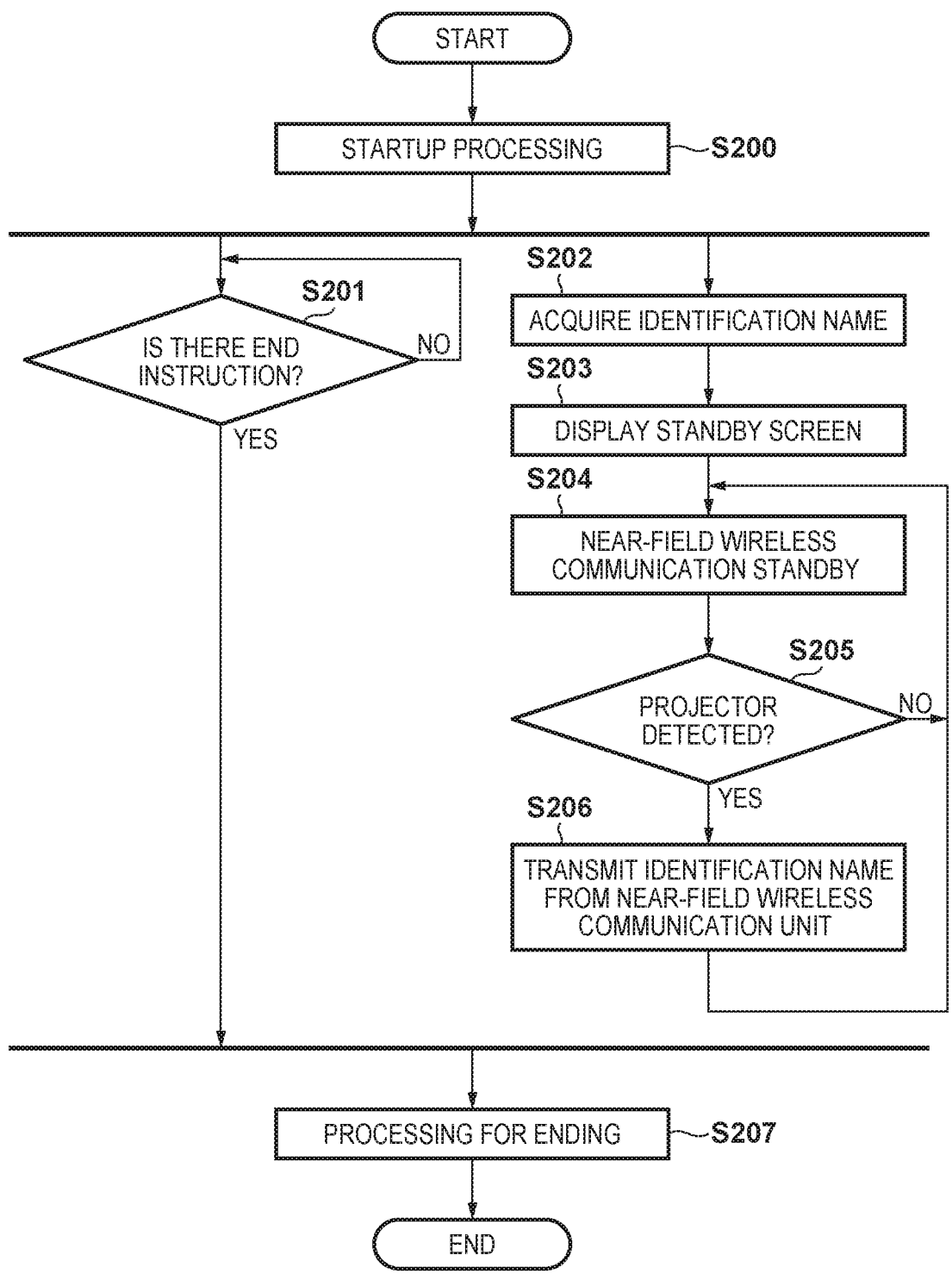
FIG. 7 is a flowchart showing a series of operations by the smartphone in the first embodiment.

Next, touch processing in the smartphone 106 will be described, with reference to FIG. 7. Note that the series of operations shown in FIG. 7 is started by the user inputting an instruction to start up an application for the multi-projection system via the operation unit 308 or the touch sensor 305, for example, after the CPU 300 has started up the OS. This application facilitates the task of grouping projectors for multi-projection, using touching of the smartphone 106 to the projectors by the user.

First, in step S200, the CPU 300 performs startup processing of the application. The CPU 300 reads out the code of the application, and data required in execution from the ROM 302. Also, the CPU 300 secures the required resources within the smartphone 106. Subsequently, the CPU 300 starts control that begins from step S201 and control that begins from step S202 in parallel.

In step S201, the CPU 300 determines whether there is an instruction to end the application from the user, via the operation unit 308 or the touch sensor 305. The CPU 300, in the case where it is determined that there is an end instruction, based on a signal transmitted from the operation unit 308 or the touch sensor 305, for example, ends the parallel processing and advances to step S207. If this is not the case, the determination of step S201 is implemented again.

Figure 8A:
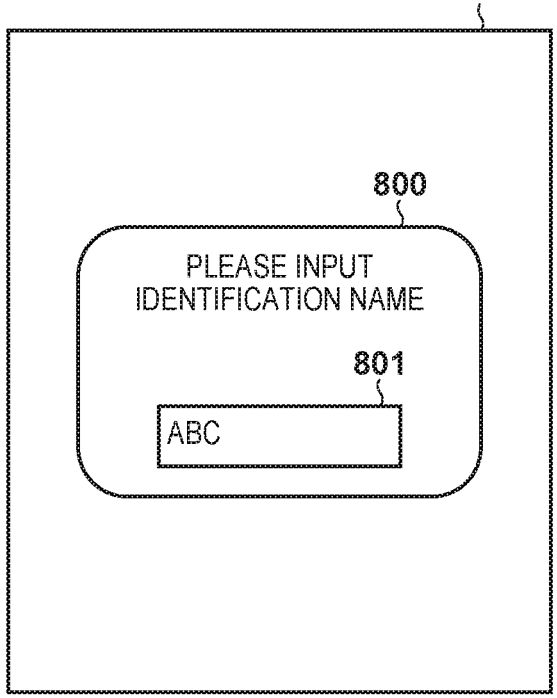
FIGS. 8A to 8D are diagrams for describing display screens of the smartphone in the first embodiment.

On the other hand, in step S202, the CPU 300 acquires an identification name. Thus, the CPU 300, first, displays an input screen for inputting an identification name (touch identification name) for indicating that a series of touch operations for including projectors in a multi-projection group correspond to the same multi-projection setting on the display panel 304, and prompts the user to input an identification name. An example of the input screen is shown in FIG. 8A. The CPU 300 displays a dialog box 800 for allowing input of an identification name on the display panel 304. The dialog box 800 includes an input form 801 for the user to input an identification name. The CPU 300 may be configured so as to acquire an identification name input by the user via the operation unit 308, by enabling the user to input a character string to the input form 801. Alternatively, the CPU 300 may be configured so as to display a software keyboard, which is not shown, on the display panel 304, and acquire a user input via the touch sensor 305. In the example of FIG. 8A, "ABC" has been input as an identification name.

Note that rather than acquiring input of an identification name by the user, the CPU 300 may generate a random character string such that a different identification name is obtained every time an application is started up. The CPU 300 may also generate a random character string in the case where the user does not input an identification name to the input form 801, and may use the random character string as an identification name. Furthermore, the CPU 300 may generate a character string showing a date and time according to when the application is started up or an identification name obtained by adding a predetermined character string to the generated character string.

Figure 8B:
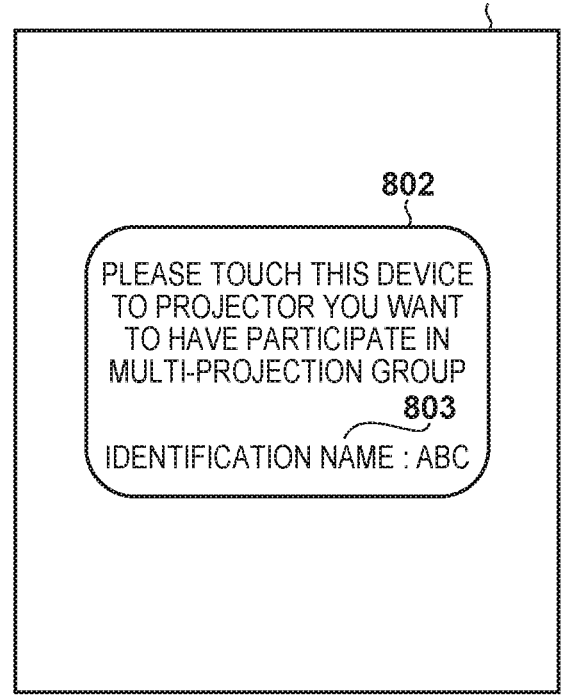

In step S203, the CPU 300) displays a standby screen. Specifically, the CPU 300 displays a screen (standby screen) prompting the user to touch the smartphone 106 to the projector on the display panel 304. For example, as shown in FIG. 8B, the CPU 300 displays a dialog box 802 for prompting the user to touch the smartphone 106 to the projector on the display panel 304. The dialog box 802 may include a display 803 showing the touch identification name acquired in step S202. Providing the display 803 enables the user to check the current identification name that is set.

In step S204, the CPU 300 controls the near-field wireless communication unit 310 to detect the proximity of the near-field wireless communication unit 219 of a projector 100, and enable communication with the projector 100 by near-field wireless communication.

In step S205, the CPU 300 determines whether the near-field wireless communication unit 219 of a projector 100 has been detected by near-field wireless communication (i.e., whether the smartphone 106 was touched to a projector 100), according to a signal from the near-field wireless communication unit 310. The CPU 300, in the case where it is determined that a projector 100 has been detected, advances to step S206, and, in the case where it is determined that the projector 100 has not been detected, the control unit 300 returns to step S204.

In step S206, the CPU 300 (since a projector 100 was detected) transmits the aforementioned identification name to the near-field wireless communication unit 219 of the detected projector 100, via the near-field wireless communication unit 310. The CPU 300 returns to step S204 again when transmission of the identification name is completed.

The CPU 300 ends the abovementioned parallel processing and advances to step S207 when an end instruction is detected in step S201 while repeating the processing of steps S204 to S206. In step S207, the CPU 300 performs processing for ending the application for the multi-projection system that is active. For example, the CPU 300 releases the resources of the smartphone 106 and executes other processing required for ending the application. Thereafter, the CPU 300 ends this series of operations.

Series of Operations Related to Touch Response Processing in Projector

Figure 9A:
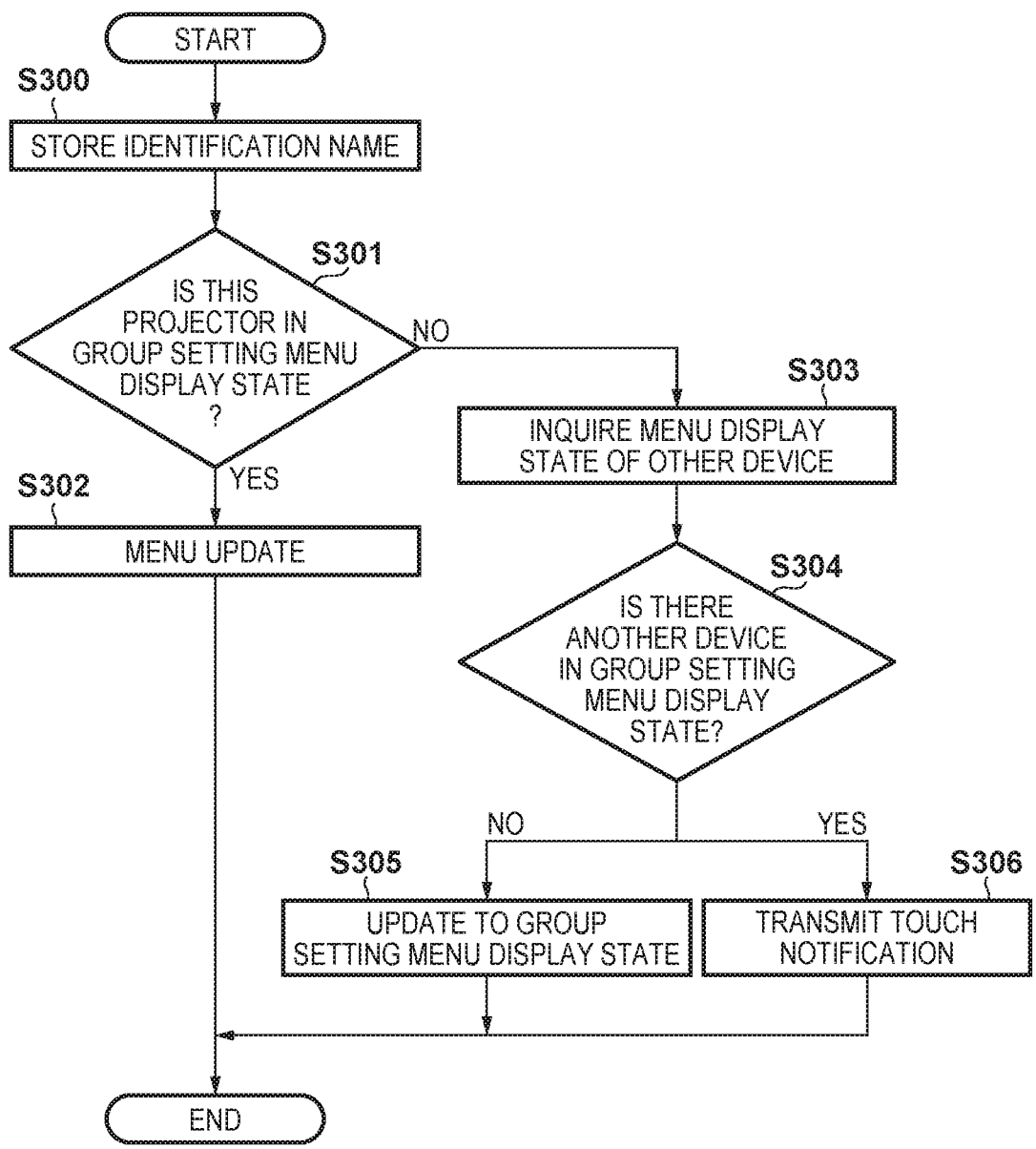

Furthermore, a series of operations related to touch response processing in the projector 100 will be described, with reference to FIG. 9A. Note that, in this processing, the series of operations (subflow) shown in FIG. 9A is started when the processing reaches step S105 in the basic operations of the projector 100 shown in FIG. 4. That is, this processing is executed when the smartphone 106 is touched to the projector 100, and an event of receiving near-field wireless communication is detected.

In step S300, the control unit 200 receives an identification name from the smartphone 106 through the near-field wireless communication unit 219. The identification name received here is the touch identification name that is transmitted from the smartphone 106 in step S206 described above in FIG. 7. The control unit 200 stores the received identification name in the RAM 203.

In step S301, the control unit 200 determines whether the menu display state of its own projector is the group setting menu display state. The control unit 200, in the case where it is determined to be the group setting menu display state using the signal from the image processing unit 205, for example, advances to step S302. If this is not the case, the control unit 200 advances to step S303.

In step S302, the control unit 200 updates the menu image 505 being displayed, according to a touch operation by the user on the menu image 505 being displayed. For example, in the case where the menu image before updating is the menu image 505 shown in FIG. 5B, the control unit 200 updates the menu image 505 such that a menu image 505a shown in FIG. 10A is displayed. That is, an icon 1000a is disposed in the column 507 of the line in the table 506 corresponding to the projector on which the menu image is being displayed. The icon 1000a is a mark indicating that the corresponding projector has been touched using the smartphone 106. The control unit 200 controls the image processing unit 205 to display the menu image 505 updated in this way in a superimposed manner. The control unit 200 ends the series of operations shown in FIG. 9A when updating of the menu image 505 is completed.

On the other hand, the control unit 200, in steps S303 to S306, executes processing for when the menu display state is not the group setting menu display state. In step S303, the control unit 200 makes an inquiry to the other projectors connected to the network 104 about the menu display state. Specifically, a signal for inquiring about the menu display state (menu display state inquiry signal) is transmitted to the other projectors connected to the network 104, via the communication unit 216. This inquiry signal is constituted in the format shown in FIG. 6E. This format consists of three fields. The first field is a source address SRC_ADDR on the network, and stores the address of the projector that transmitted the inquiry signal. The second field is a destination address DEST_ADDR on the network, and stores a special broadcasting address, in order to target all of the devices on the network with the menu display state inquiry. The third field is data indicating the communication contents, and is an identifier indicating "menu display state inquiry".

The other projectors connected to the network 104 send back a response (menu display state response signal) in the format shown in FIG. 6F, upon receiving the menu display state inquiry signal. This format consists of four fields. The first field is a source address SRC_ADDR on the network, and stores the address of the projector that transmits the response. The second field is a destination address DEST_ADDR on the network, and stores the address (SRC_ADDR of the packet in FIG. 6E) of the projector that transmitted the packet (i.e., menu display state inquiry signal) in FIG. 6E. The third field is data indicating the communication contents, and is an identifier indicating "menu display state response". The fourth field is menu display state MENU_STATE and stores the menu display state of the projector that transmits the menu display state response signal. The control unit 200 receives the menu display state response signal transmitted from the other projectors, and acquires the menu display state of the other projectors.

In step S304, the control unit 200 determines whether there is a projector that is in the group setting menu display state, with reference to the menu display states of the other projectors connected to the network 104 acquired in step S303. The control unit 200 advances to step S306 in the case where it is determined that there is a projector that is in the group setting menu display state from menu display state MENU_STATE of the acquired signals, for example. In the case where this is not the case, the control unit 200 advances to step S305.

In step S305, control unit 200 changes the current menu display state to the group setting menu display state, and instructs the image processing unit 205 to superimpose the corresponding menu image. Note that, here, the projector that includes the control unit 200 has been touched by the smartphone 106, and thus an image in which the icon 1000a has been added such as the menu image 505a shown in FIG. 10A is displayed. Thereafter, the control unit 200 ends the series of operations related to the identification name acquisition processing in the projector shown in FIG. 9A.

On the other hand, in step S306, the control unit 200 transmits a signal (touch notification signal) notifying that the projector that includes the control unit 200 has been touched by the smartphone 106 to the other projectors that are in the group setting menu display state via the communication unit 216. This touch notification signal is constituted in the format shown in FIG. 6G. This format consists of four fields. The first field is a source address SRC_ADDR on the network, and stores the address of the projector that sends the touch notification signal. The second field is a destination address DEST_ADDR on the network, and stores the address of the other projectors that are in the group setting menu display state. The third field is data indicating the communication contents of the signal, and is an identifier indicating "touch notification". The fourth field is a touch identification name TOUCH_ID, and stores the touch identification name stored in step S300. The projectors that receive this touch notification signal sends back a response (acknowledgement signal) in the format shown in FIG. 6H. This response indicates that the touch notification signal was received normally, and is as described above. The control unit 200 of the projector that is the transmission source of the touch notification signal (transmission destination of the response) confirms that notification has been completed by receiving this acknowledgement signal via the communication unit 216. The group setting menu being displayed by the projector that is the transmission destination is updated as a result of this communication. Updating of the group setting menu that depends on reception of the touch notification will be described in detail in step S403 described below. The control unit 200 ends the series of operations related to the touch response processing of FIG. 9A when transmission of the acknowledgement signal is completed.

Series of Operations Related to Communication Response Processing in Projector

Next, a series of operations related to communication response processing in the projector 100 will be described, with reference to FIG. 9B. With this processing, the series of operations (subflow) shown in FIG. 9B is started when the processing reaches step S106 in the basic operations of the projector 100 shown in FIG. 4. This processing is executed in response to having received communication from other projector connected on the network 104. In particular, this includes processing that is executed through communication resulting from the other projector being touched by the smartphone 106.

In step S400, the control unit 200 determines the contents of communication received from other projector. The control unit 200, in the case where it is determined that the communication contents of the received signal is the "menu display state inquiry" shown in FIG. 6E, advances to step S401. Also, the control unit 200, in the case where it is determined that the communication contents of the received signal is the "touch notification" shown in FIG. 6G, advances to step S402 (after sending back the acknowledgement signal shown in FIG. 6H). The control unit 200, in the case where it is determined that the communication contents of the received communication is the "group inclusion notification" shown in FIG. 6C, advances to step S405 (after sending back the acknowledgement signal shown in FIG. 6H). The control unit 200, in the case where it is determined that the communication contents of the received communication is the "existence inquiry" shown in FIG. 6A, advances to step S407. The control unit 200, in the case where the received communication contents is the "layout setting instruction" shown in FIG. 6D, advances to step S408 (after sending back the acknowledgement signal shown in FIG. 6H).

In step S401, the control unit 200 sends back a response indicating one of the menu hidden state, the main menu display state, the group setting menu display state and the layout setting menu display state in the format shown in FIG. 6F, in accordance with the menu display state of its own projector. The control unit 200 ends this series of operations when sending back of a response indicating the menu display state has been completed.

In step S402, the control unit 200 determines whether the menu display state of its own projector is the group setting menu display state. The control unit 200, in the case where it is determined that the menu display state of its own projector is the group setting menu display state, advances to step S403. If this is not the case, the control unit 200 ends this series of operations.

In step S403, the control unit 200 updates the group setting menu being displayed, based on the received touch notification signal. Specifically, the control unit 200) adds an icon to the column 507 of the line, in the table 506 of the menu image 505, corresponding to the projector from which the touch notification was received. The display of the menu image 505 may be the display shown in FIG. 10B, for example.

The menu image 505b of FIG. 10B shows exemplary display after the touch notification signal has been received from three projectors while the group setting menu shown in the menu image 505a of FIG. 10A is being displayed, and the menu image has been sequentially updated. Note that the touch notification signal is received from the projector corresponding to the IP addresses 192.168.100.26, 192.168.100.27 and 192.168.100.28. The control unit 200 subsequently displays an icon 1000b1 since its own projector has already been touched by the smartphone 106. In addition, icons 1000b2 to 1000b4 are displayed. These icons are displayed in correspondence with the lines of the projectors that are the transmission source of the touch notification signal. Note that the control unit 200 determines whether any of the identification names (received as TOUCH_ID of FIG. 6G) corresponding to the icons 1000b2 to 1000b4 differ from the identification name (stored in step S300) corresponding to the icon 1000b1. If there is a different identification name, the icon corresponding to the different identification name among the icons 1000b2 to 1000b4 need not be display. That is, the identification name being different is presumed to be because of the identification name being generated by a different smartphone and to be due to unrelated communication that happened to be performed at the same time. Also, the control unit 200 may be configured so as to check the checkboxes of the column 508 of the projectors to which the icons 1000b2 to 1000b4 have been added in the table 506. This is because it is preferable to set the projectors corresponding to the icons 1000b2 to 1000b4 as the multi-projection group, since it can be presumed these projectors were touched by the same smartphone, as a result of having the same identification name.

Alternatively, the display of the menu image 505 may be the display shown in FIG. 10C, for example. The menu image 505c of FIG. 10C shows exemplary display after the touch notification signal has been received from three projectors while the group setting menu shown in the menu image 505 of FIG. 5B is being displayed, and the menu image has been sequentially updated. In this example, it is assumed that the touch notification signal has arrived from the projectors corresponding to the IP addresses 192.168.100.26, 192.168.100.27 and 192.168.100.28. The control unit 200 does not display an icon since its own projector has not yet been touched by the smartphone 106, and the corresponding location is given as blank 1001. On the other hand, the control unit 200 displays the icons 1000b2 to 1000b4. These icons are displayed in correspondence with the lines of the projectors that are the transmission source of the touch notification signal. Also, the control unit 200 may be configured so as to not check the checkboxes of the column 508 of the projectors to which the icons 1000b2 to 1000b4 have been added in the table 506. This is because, despite knowing that the projectors corresponding to the icons 1000b2 to 1000b4 have been touched by a predetermined smartphone, it has not yet been ascertained whether the touch relates to the current multi-projection setting.

Note that when a menu operation by the user is performed thereafter, one of the checkboxes on the lines corresponding to the icons 1000b2 to 1000b4 of the table 506 may be checked as a result of this menu operation. In this case, it can be presumed that these touches concern the multi-projection setting that is currently being performed. The control unit 200 may thus be configured to check the checkboxes of the lines corresponding to the icons 1000b2 to 1000b4.

Note that, in the case where the smartphone 106 is touched to the projector that includes the control unit 200, an icon is displayed at the location of the blank 1001 in step S302. At this time, if the identification name of the touch to its own projector matches the identification name stored in the communication that resulted in icons 1000b2 to 1000b4, the control unit 200 may be configured so as to check the checkboxes of the lines corresponding to the icons 1000b2 to 1000b4.

In step S404, the control unit 200 transmits notification indicating the group inclusion notification. Specifically, the control unit 200 notifies the projectors that were included in the group in step S403 (i.e., projectors with respect to which the checkbox of the column 508 of the corresponding lines in the table 506 has been checked) that these projectors have been included in the multi-projection group. This notification is similar to the group inclusion notification described above in step S104. Note that if, in step S403, there are no projectors that have been included in the group, processing need not be performed in this step. Thereafter, the control unit 200 ends the series of operations shown in FIG. 9B.

In step S405, the control unit 200 determines whether the menu display state of its own projector is the group setting menu display state. If it is determined not to be the group setting menu display state, the control unit 200 advances to step S406. If this is not the case, the series of operations shown in FIG. 9B is ended.

In step S406, the control unit 200 stores the content of the received group inclusion notification signal in the RAM 203. That is, the control unit 200 stores GROUP_ID shown in FIG. 6C, and also stores, in association with the GROUP_ID, whether the processor is included in the group (TRUE) or has withdrawn from the group (FALSE). Thereafter, the control unit 200 ends the series of operations shown in FIG. 9B.

In step S407, the control unit 200 transmits a response indicating that its own projector exists to the transmission source of the received existence inquiry signal, via the communication unit 216. Since this response is similar to the existence response signal described above in step S103, description thereof is omitted. Thereafter, the control unit 200 ends the series of operations shown in FIG. 9B.

In step S408, the control unit 200 configures the settings for multi-projection, based on the received layout setting instruction. An example of the settings for multi-projection will be described with reference to FIG. 11, but the present embodiment is not intended to be limited to this example.

Figure 11:
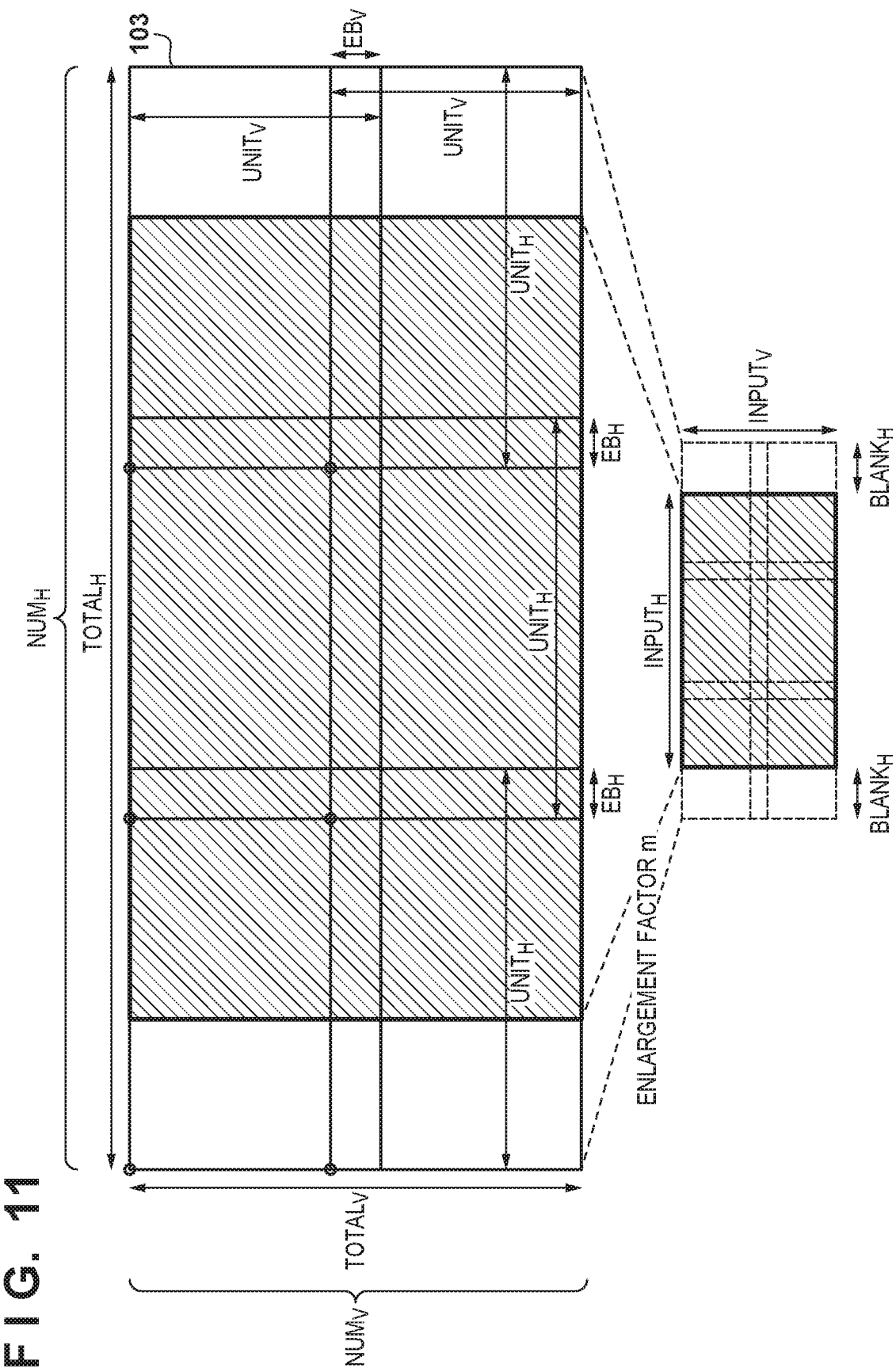
FIG. 11 is a diagram for describing multi-projection layout setting in the first embodiment.

FIG. 11 shows an example of the integrated screen 103 of multi-projection that consists of horizontally $NUM_H$ and vertically $NUM_V$ of projectors 100. The horizontal overlapping area (edge blend area) between the individual screens is commonly a width of $EB_H$ pixels. The vertical overlapping area (edge blend area) between the individual screens is commonly a width of $EB_V$ pixels. The width and height of the screen for projection display by each projector 100 are respectively given as $UNIT_H$ pixels and $UNIT_V$ pixels. The width and height of an input image are respectively given as $INPUT_H$ pixels and $INPUT_V$ pixels. Multi-projection is formed by input image data being commonly input to all of the projectors 100, and each of projectors 100 enlarging the input image by a factor of m and clipping and displaying their respective areas. Here, $NUM_H$, $NUM_V$, $EB_H$, and $EB_V$ are known using the received layout setting instruction signal (FIG. 6D). $UNIT_H$ and $UNIT_V$ are specifications of the projector, and are thus known. $INPUT_H$ and $INPUT_V$ are based on image data that the projector inputs, and are thus known. Width $TOTAL_H$ and height $TOTAL_V$ of the integrated screen are derived as follows.

$$TOTAL_H = UNIT_H * NUM_H - EB_H * (NUM_H - 1)$$

$$TOTAL_V = UNIT_V * NUM_V - EB_V * (NUM_V - 1)$$

An example of the enlargement processing and clipping processing by each projector 100 as referred to here will be described. First, the control unit 200 of each projector adds a black band to the top and bottom or the right and left of the input image, so as to adjust the aspect ratio of the input image to the aspect ratio of the integrated screen. Specifically, the control unit 200 adds a black band of width $BLANK_H$ to the right/left of the input image, in the case where $TOTAL_H/TOTAL_V > INPUT_H/INPUT_V$. $BLANK_H$ and the enlargement factor m are derived as follows.

$$BLANK_H = (TOTAL_H * INPUT_V / TOTAL_V - INPUT_H)/2$$

$$m = TOTAL_V / INPUT_V$$

If this is not the case, a black band (not illustrated) of width $BLANK_V$ is added to the top and bottom of the input image. $BLANK_V$ and the enlargement factor m are derived as follows.

$$BLANK_V = (TOTAL_V * INPUT_H / TOTAL_H - INPUT_V)/2$$

$$m = TOTAL_H / INPUT_H$$

The image after the input image has had black bands added thereto and been enlarged by a factor of m by the control unit 200 matches the size of the integrated image. Each projector derives clipping coordinates (x, y) with respect to the enlarged image as follows. An example of (x, y) is shown with the circular marks in FIG. 11. $POS_H$ and $POS_V$ is the position of the projector that includes the control unit 200 that is known from the received layout setting instruction (FIG. 6D).

$$x = (POS_H - 1) * (UNIT_H - EB_H)$$

$$y = (POS_V - 1) * (UNIT_V - EB_V)$$

Furthermore, the control unit 200 of each projector performs clipping on the enlarged image at a width of $UNIT_X$ pixels and a height of UNITY pixel from upper left coordinates (x, y).

In this way, the control unit 200 (in step S408) controls the image processing unit 205 to perform black band addition processing, enlargement processing and clipping processing such as described above, for example. Furthermore, the control unit 200 may control the image processing unit 205 to perform illumination reduction processing on the edge blend area. In this illumination reduction processing, since projection display by a plurality of projectors is overlapped in the edge blend area, brightness is only reduced in that area in each projector, such that the combined illuminance in the overlapping area will be equivalent to illuminance of projection display by one projector. Note that, in the present embodiment, settings other than these may be configured. For example, the layout setting instruction may be configured so as to include the target brightness and color coordinates, and the control unit 200 may control image processing by the image processing unit 205 to conform to the brightness and color coordinates. Thereafter, the control unit 200 ends the series of operations shown in FIG. 9B.

Operation Sequence of System

Furthermore, an example of a sequence in which the smartphone 106 and projectors 100 described above coordinate operations will be described, with reference to FIG. 12.

Figure 12:
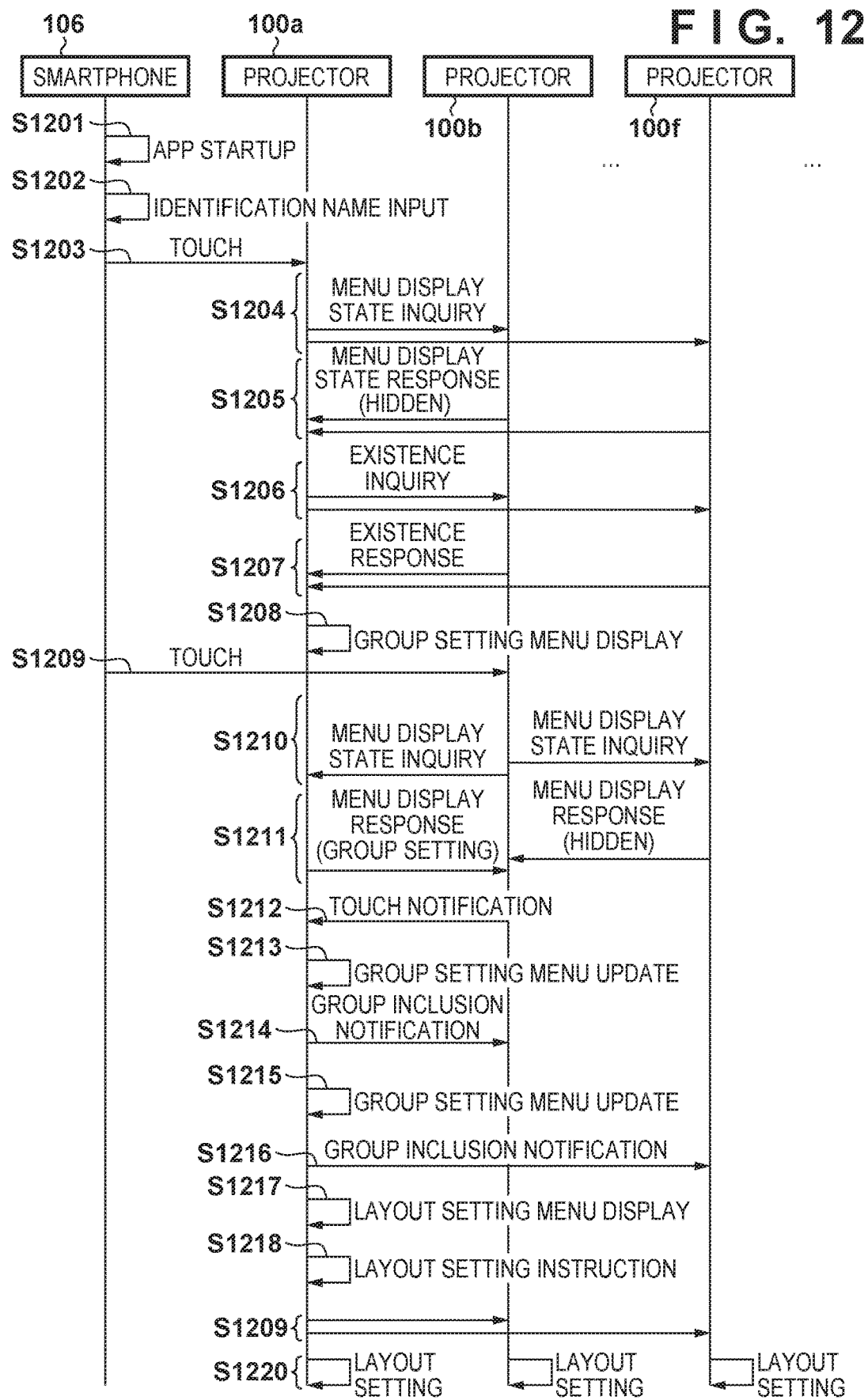
FIG. 12 is a diagram for describing a sequence in the first embodiment.

FIG. 12 shows an example of the operation sequence in the system illustrated in FIG. 1. Note that this operation sequence is started from the point in time at which information on clipping, edge blending and the like has yet to be set, despite an image to be displayed having been input to the projectors 100a to 100f. Also, control units 200a to 200f of the projectors 100a to 100f have not yet grasped that they have been grouped together. Furthermore, the projectors 100a to 100f have been started up by a user or the like, for example, but are all in the menu hidden state.

In step S1201, a user 105 starts up an application for setting multi-projection on the smartphone 106. At this time, the smartphone 106 executes the operation of step S200 described above. In step S1202, the user 105 inputs an identification name of this touch operation into the smartphone 106. At this time, the smartphone 106 executes the operation of step S202 described above.

In step S1203, the user 105 touches the smartphone 106 to the projector 100a, in order to configure settings for adding the projector 100a to the multi-projection group. At this time, the smartphone 106 executes the operations of step S206 described above. In step S1204, the projector 100a executes the operations of step S105 described above. In this operation, the projector 100a executes processing of step S303 described above to broadcast a menu display state inquiry signal over the network 104.

On the other hand, in step S1205, the projectors 100b to 100f, upon receiving the menu display state inquiry signal, execute the operation of step S401 described above to send back a response indicating the menu hidden state, to the projector 100a. In step S1206, the projector 100a, having received the response from projectors 100b to 100f, executes the operation of step S304 described above. In the example of FIG. 12, the projector 100a determines that there are no other projectors in the group setting menu display state, and broadcasts an existence inquiry signal over the network 104, in order to display the group setting menu 505. In step S1207, projectors 100b to 100f execute the operation of step S407 described above to send back a response indicating existence upon receipt of the broadcast existence inquiry signal.

In step S1208, the projector 100a executes the operation of step S305 described above to display the group setting menu 505 reflecting the response from projectors 100b to 100f. At that time, since the projector 100a has been touched by the smartphone 106, an icon (e.g., 1000a) is displayed in the column 507 of the line of the projector 100a in the menu.

In step S1209, the user 105 touches the smartphone 106 to the projector 100b, in order to configure settings for adding the projector 100b to the multi-projection group. At this time, the smartphone 106 executes the operation of step S206 described above.

In step S1210, the projector 100b executes the operation of step S105 described above. In this operation, the projector 100b executes the operation of step S303 described above to broadcast a menu display state inquiry over the network 104.

In step S1211, the projectors 100c to 100f execute the operation of step S401 described above to transmit a response indicating the menu hidden state to the projector 100b. On the other hand, the projector 100a executes the operation of step S401 described above to transmit a response indicating the group setting menu display state to the projector 100b (since the group setting menu is being displayed).

In step S1212, the projector 100b executes the operation of step S306 described above to transmit, to the projector 100a that sent back the response indicating the group setting menu display state, notification indicating that the projector 100b has been touched. The projector 100b thereby causes the touch information of the projector 100b to be displayed on the group setting menu being displayed on the projector 100a. Note that, in FIG. 12, description of the acknowledgment that is received back from projectors that have been notified is omitted for simplification of the diagram.

In step S1213, the projector 100a executes the operation of step S403 described above to update the group setting menu. Specifically, the projector 100a displays an icon in the column 507 on the line of the projector 100b in the group setting menu. In addition, the projector 100a checks the checkbox of the column 508 (displays a check mark) on the line of the projector 100b.

In step S1214, the projector 100a executes the operation of step S404 described above to transmit notification indicating inclusion in the group to the projector 100b. Note that, in FIG. 12, illustration of the acknowledgment that is received back from projectors that have been notified is omitted for simplification of the diagram.

In step S1215, the projector 100a executes the operation of step S103 described above to update the group setting menu. For example, assume that it is difficult for the user 105 to touch the smartphone 106 to the projector 100f which is installed in a suspended state as shown in FIG. 1, for example. Thus, the user 105, by operating the projector 100a, checks the checkbox of the column 508 on the line of the projector 100f in the table 506 that is displayed in the group setting menu that is being displayed by the projector 100a.

In step S1216, the projector 100a executes the operation of step S104 to perform notification indicating inclusion in the group to the projector 100f. Note that, in FIG. 12, description of the acknowledgment received back from projectors that have been notified is omitted.

In step S1217, the user 105 operates the projector 100a to end the group setting menu and display the layout setting menu. At this time, the projector 100a executes the operation of step S103 described above to display the layout setting menu. In step S1218, the user 105 operates the layout setting menu illustrated in the menu image 511. In step S1219, the projector 100a executes the operation of step S104 described above to transmit the layout setting instruction signal to the projectors 100a, 100b and 100f belonging to the group. Note that, in FIG. 12, description of the acknowledgment received back from projectors that have been notified is omitted.

In step S1220, the projectors 100a. 100b and 100f execute the operation of step S408 described above, and configure the multi-projection layout settings, based on the received layout setting instruction.

Adopting this configuration enables setting of multi-projection of the projectors 100a, 100b and 100f. Note that, in the example shown in FIG. 12, a configuration of three projectors was illustrated, in order to facilitate description, but the present embodiment is not limited to this number, and a configuration of six projectors 100a to 100f is possible. Any configuration of two or more projectors may be adopted.

In the above, the projection system according to the present embodiment is described. Conventionally, in the case of displaying projectors connected to the network 104 as a list, for example, when a large number of projectors were displayed, there would sometimes be unrelated projectors, and operating a menu to select projectors required time and effort. Moreover, in order to distinguish whether to add a projector to the group, it was difficult to distinguish from limited information such as an address or model number. In view of this, by adopting a configuration for viewing and selecting projectors that have been touched with the smartphone 106 as described above in FIG. 10B, the user 105 need only select projectors 100 that are actually in front of him or her by touching the projectors, reducing the time and effort and the difficultly described above. On the other hand, there are generally various modes of installing projectors, and thus in the case where, for example, the projectors 100d to 100f are installed in a suspended manner as shown in FIG. 1, the user 105 may have difficultly touching the projectors, due to reasons such as not being able to reach the projectors. Even in such cases, the user 105 is also able to set a group that includes the projectors 100d to 100f that cannot be reached, by operating the menu. In this case, an icon corresponding to the projector in the menu is not added. In this way, according to the present embodiment, the user is able to easily distinguish, depending on display by each projector, whether the projector was included in the group through a menu operation or the projector was included in the group by being touched. That is, it becomes possible to easily grasp the projectors constituting multi-projection, and the efficiency of the task of setting multi-projection is increased.

Variation of Present Embodiment

Note that, in the example described above, in order to show the projectors touched using the smartphone 106, the icon 1000 is displayed in the group setting menu, but other means may be used. For example, a touch identification name 1300a1 may be displayed and used instead of the icon 1000 as shown in FIG. 13A. At this time, even if there is a projector with a different identification name (e.g., "DEF") from the touch identification name (e.g., "ABC") of the projector that includes the control unit 200, that projector may be displayed. In this way, any means that can identifiably display whether a projector has been touched may be used.

Also, the control unit 200 may rearrange the group setting menu table 506, according to whether or not the projector 100 was touched using the smartphone 106. For example, as shown in FIG. 13B, the table 506 may be displayed such that touched projectors are at the top. Furthermore, the display of the table 506 may be sorted (the display order may be changed) by touch identification name.

Note that, in the example described above, a configuration is adopted in which each projector is displayed in the group setting menu so that it is identifiable whether the projector joined the group by being touched using the smartphone 106 or joined the group by another method. However, such display may also be performed in menus other than the group setting menu. For example, a configuration may be adopted in which such display is applied to multi-projection disposition of the menu image 511 for performing the layout setting shown in FIG. 5C, and icons are displayed for projectors touched using the smartphone 106.

Furthermore, an image that indicates whether the projector joined the group by being touched using the smartphone 106 or joined the group by another method may be displayed with display means other than projection. For example, display may be performed on the display unit 217 of the projector 100. That is, the control unit 200 may display the group setting menu on the display unit 217.

Also, in the abovementioned example, if there is a projector that is displaying the group setting menu in the case where a projector that is not displaying the group setting menu is touched using the smartphone 106, that projector is notified that the projector was touched. On the other hand, if there are no projectors displaying the group setting menu, the menu is displayed on the projector that was touched (step S304, step S305, step S306). In contrast, in a similar case where there are no projectors displaying the group setting menu (i.e., in the case of a No determination in step S304), a configuration may be adopted in which notification indicating that the projector was touched is broadcast on the network 104 instead of executing step S305. A projector that receives that broadcast determines No in step S402, but may be configured so as to perform additional processing to store the touch information in a memory. As a result of adopting this configuration, display that is based on the stored touch information may be performed, in the case where the group setting menu is displayed by one of the projectors next time (step S103). Also, with regard to the touch information, in the case where a valid period of predetermined length after reception is set and that period elapses, the touch information may be invalidated.

Note that, in the example described above, a form of projection referred to as so-called multi-projection (otherwise known as tiling projection) in which projection screens are displayed side by side was described, but the present embodiment is not limited to the mode of this projection. For example, the present embodiment is also applicable at the time of group setting of stack projection in which a plurality of projection screens are displayed in a superimposed manner in the same place. That is, the present embodiment is applicable to any form in which a plurality of projectors coordinate projection.

Also, in the example described above, the case where all of the projectors that are used have the near-field wireless communication unit 219 was described as an example. However, the present embodiment is also applicable in multi-projection that includes projectors that do not have near-field wireless communication means. For example, projectors that do not have near-field wireless communication means need only be handled similarly to the projectors installed in a suspended manner in the example described above, and there need only be one or more projectors having a near-field wireless communication unit, among the projectors constituting multi-projection.

Furthermore, in the example described above, an example in which only an identification name is transmitted from the smartphone 106 to the projector 100 at the time of touching is described. However, the smartphone 106 may, for example, transmit information concerning multi-projection of edge blend width information and the like at the same time as the identification name. At this time, if this information is included in the touch notification described in FIG. 6G, substitution of settings in the layout setting menu is possible, and an increase in task efficiency can be attained, for example.

Also, the example described above can be modified as follows. The control unit 200, in the case where acknowledgment is not received from a projector to which the touch notification was transmitted within a predetermined time after transmission in step S306, may advance to step S305. This configuration is adopted because of cases where phenomena, such as power being turned off, disconnection from the network and malfunctioning, occur in projectors to which the touch notification was transmitted, for example. Also, in such cases, the control unit 200 may be configured to display through projection that the projector is in abnormal state.

Furthermore, the example described above can be modified as follows. The control unit 200, in step S104, in the case where acknowledgment is not received back from the projector to which the layout setting instruction was transmitted within a predetermined time period after transmission, may display through projection that an error has occurred.

Also, a similar effect can be obtained, even when the present embodiment is applied to a display system that uses a plurality of display apparatuses other than projectors. This embodiment can be applied to a display system in which a plurality of flat panels that use liquid crystal panels or organic EL panels or to a display system in which a plurality of display modules having LEDs arranged in a matrix are arranged side by side. The present embodiment is also convenient when grouping these panels or display modules, as long as grouping by touching with a smartphone is possible. For example, consider the case of a display system in which the height of flat panel displays serving as display apparatuses constituting the display system is 1.5 m, and three or more display apparatuses are arranged side by side in the vertical direction. Since the user can reach the first display apparatus (located 0 m to 1.5 m from the bottom side of the system) and the second display apparatus (located 1.5 m to 3 m from the bottom side of the system), these display apparatuses can be touched with the smartphone. However, in the case of the third display apparatus (located 3 m to 4.5 m from the bottom side of the system) onward from the bottom, the user cannot reach, and touching the display apparatus with the smartphone become difficult. In such cases, grouping by other means in addition to grouping by touch becomes necessary, and grouping of the display apparatuses can be facilitated by applying a similar technology as the present embodiment.

Second Embodiment

Next, a second embodiment will be described. The present embodiment differs from the first embodiment in providing the smartphone 106 with the function of the group setting menu of multi-projection, while the overall configuration of the system, the detailed configuration of the projector in the present embodiment, and the detailed configuration of the smartphone are substantively similar. Accordingly, the same reference signs are given to configuration that is the same and redundant description is omitted, with the following description focusing on the differences.

Overall Configuration

The overall configuration according to the second embodiment is similar to the configuration described with reference to FIG. 1 in the first embodiment. However, in the present embodiment, the smartphone 106 is given as being connected to the network 104, via the communication unit 309.

Series of Operations in Smartphone

Figure 14A:
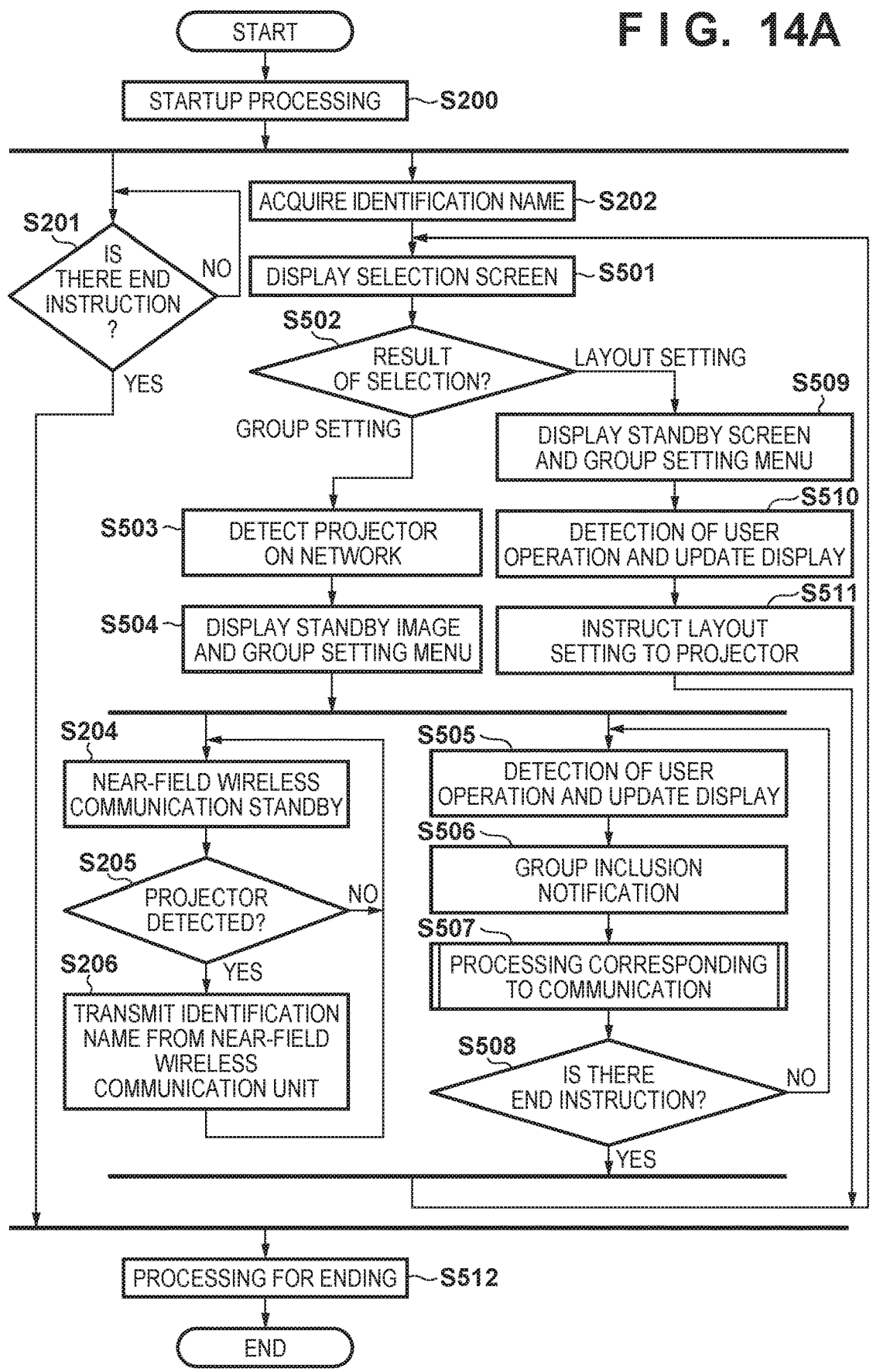
FIGS. 14A and 14B are flowcharts showing a series of operations by a smartphone in a second embodiment.
Figure 14B:
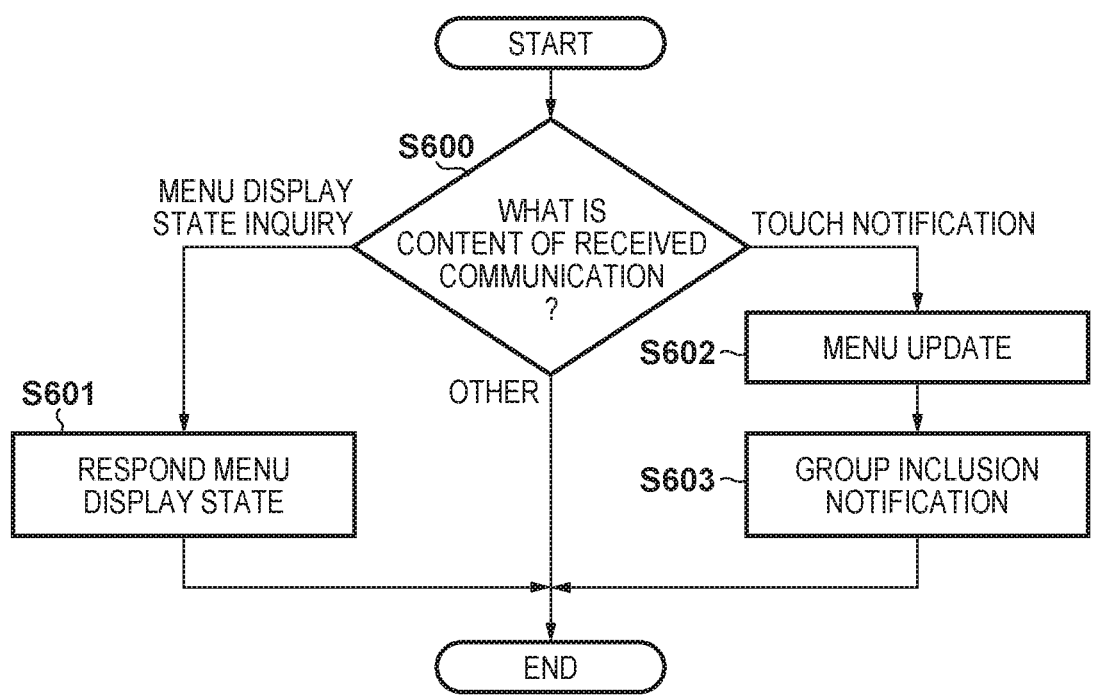

A series of operations in the smartphone 106 will be described, with reference to FIGS. 14A and 14B. The series of operations shown in FIG. 14A is started at the point in time that the user inputs the startup instruction to the application for this multi-projection system, in a state in which the CPU 300 has started up the OS. This application facilitates the task of grouping projectors for multi-projection, by touching the smartphone 106 to the projectors.

The CPU 300 executes steps S200, S201 and S202 similarly to the first embodiment. In the case where it is determined, in step S201, that an end instruction from the user has been received, the CPU 300 advances to step S512. On the other hand, the CPU 300 advances to step S501 when a touch identification name (i.e., showing that this series of operations for touching is the same context) is acquired in step S202.

Figure 8C:
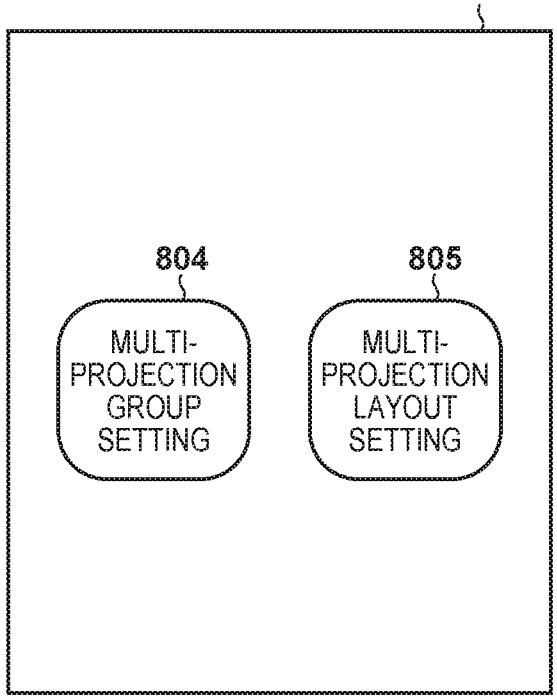

In step S501, the CPU 300 displays a screen (selection screen) for selecting a setting menu on the display panel 304. An example of this screen is shown in FIG. 8C. This screen has a selection option 804 for causing the display panel 304 to display the group setting menu of multi-projection, and a selection option 805 for causing the display panel 304 to display the layout setting menu. The user is able to select one of these selection options.

In step S502, the CPU 300 determines whether the selection result in step S501 is an instruction selecting the group setting menu or an instruction selecting the layout setting menu. In the case where the selection option 804 is selected, the CPU 300 advances to step S503. In the case where the selection option 805 is selected, the CPU 300 advances to step S509.

Upon advancing to step S503, the CPU 300 detect the existence of the projector 100 on the network 104. Specifically, the existence inquiry signal of FIG. 6A described in the first embodiment is broadcast over the network 104, via the communication unit 309. Note that SRC_ADDR at this time is given as the address of the smartphone 106 that is the transmission source. The existence response of FIG. 6B is transmitted from the projectors connected to the network 104, in response to the inquiry. The CPU 300 is thereby able to detect the existence of the projectors from which there was a response.

Figure 8D:
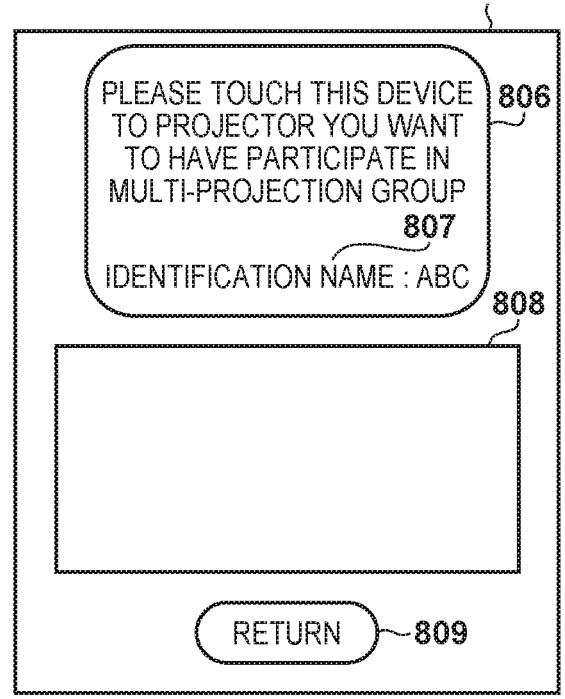

In step S504, the CPU 300 causes the display panel 304 to display an image that shows waiting for near-field wireless communication and the group setting menu. This exemplary display is shown in FIG. 8D. A dialog box 806 for prompting the user to touch the smartphone 106 to projectors is displayed on the display panel 304. Display 807 showing the identification name acquired in step S202 may be provided in the dialog box 806. Providing the display 807 enables the user to check the current identification name. Also, the CPU 300 displays similar display to the menu image 505 of the group setting menu described in the first embodiment in an area 808 of the display panel 304. Also, the CPU 300 displays a selection option 809 for returning to the selection menu of FIG. 8C on the display panel 304. The CPU 300 starts control that begins from step S204 and control that begins from step S505 in parallel when the screen shown in FIG. 8C is displayed.

The CPU 300 repeats the processing of steps S204 to S206 similar to the first embodiment, and when the near-field wireless communication unit 219 of a projector 100 is detected, transmit the touch identification name to the detected projector 100.

On the other hand, in step S505, the CPU 300 detects a touch operation by the user on the group setting menu displayed in step S504, and updates the group setting menu being displayed based on this touch operation. Specifically, the CPU 300 performs updating to check or uncheck the checkbox of the column 508 in the table 506 based on a user operation. Note that this processing corresponds to processing of the group setting menu described in step S103.

In step S506, in the case where the CPU 300 has updated the checkbox in step S505, the CPU 300 transmits notification indicating addition to the multi-projection group to the corresponding projector 100, via the communication unit 309. This notification is similar to the group inclusion notification shown in FIG. 6C.

In step S507, the CPU 300 detects communication received via the communication unit 309, and performs processing that depends on the detected communication. Specifically, the CPU 300 executes the series of operations described in FIG. 14B.

First, in step S600, the CPU 300 determines the contents of the received communication, based on the contents of the received communication. The CPU 300, in the case where the "menu display state inquiry" signal described using FIG. 6E is received, advances to step S601. The CPU 300, in the case where the "touch notification" signal described using FIG. 6G is received, advances to step S602. The CPU 300, in the case where another signal is received, the CPU 300 ends the series of operations shown in FIG. 14B without performing specific processing.

In the case of advancing to step S601, the CPU 300 transmits the menu display state response signal described in FIG. 6F to the transmission source of the menu display state inquiry, via the communication unit 309, and returns a response indicating the group setting menu display state, for example. Thereafter, the CPU 300 ends the series of operations shown in FIG. 14B.

In the case of advancing to step S602, the CPU 300 updates the group setting menu being displayed, based on the received touch notification. The CPU 300, in other words, adds an icon to the column 507 on the line of the table 506 in the area 808 (group setting menu) corresponding to the projector from which the touch notification was received. Furthermore, the CPU 300 may check the checkbox of the column 508 on that line. Note that this processing of checking the checkbox may be limited to the case where the identification name that is included in the touch notification matches the identification name acquired in step S502. Note that the icon display processing may be limited to the case where the identification name that is included in the touch notification matches the identification name acquired in step S502.

Subsequently, in step S603, the CPU 300 transmits notification indicating addition to the multi-projection group to the projector included in the group in step S602 (i.e., projector of the line on which the checkbox of the column 508 was checked). This notification is similar to the group inclusion notification described in step S104. Note that if there are no projectors included in the group in step S602, no processing is performed in this step. The CPU 300, thereafter, ends the series of operations shown in FIG. 14B.

Description will be given with reference to FIG. 14A again. In step S508, the CPU 300 determines whether there is an instruction for ending group setting. Specifically, the CPU 300 determines whether there was a user operation on the selection option 809 within the screen displayed in step S504. The CPU 300), in the case where it is determined that there is an instruction for ending group setting, ends the parallel processing of steps S204 to S206 and steps S505 to S508, and returns to step S501. If there is no instruction for ending group setting, the CPU 300 returns to step S505.

On the other hand, in the case where it is determined that layout setting has selected in step S502, the CPU 300, in step S509, displays the layout setting menu on the display panel 304. This menu is similar to the menu image 511 of FIG. 5C described in the first embodiment. In step S510, the CPU 300 detects a user operation via the touch sensor 305 on the layout setting menu displayed in step S509, and updates this menu based on the detected operation. Specifically, based on the user operation, the setting item 512, a setting item 513, a setting item 514 and a setting item 515 are updated.

In step S511, the CPU 300 transmits the layout setting instruction shown in FIG. 6D to each projector via the communication unit 309, based on the contents updated in step S510. This processing corresponds to the processing on the menu image 511 described in step S104. The CPU 300 thereafter returns to step S501.

When an end instruction is detected in step S201, the CPU 300 ends the parallel processing described above, and performs processing for ending the application in step S512. Here, the CPU 300 releases the resources of the smartphone 106 and performs other processing required for ending the application. Thereafter, the CPU 300 ends this series of processing.

Series of Operations in Projector

The series of operations in the projector 100 are similar to the operations of the first embodiment described with reference to FIGS. 9A and 9B.

Operation Sequence of System

Next, an example of a sequence in which the smartphone 106 and projectors 100 described above coordinate operations will be described, with reference to FIG. 15. At the start point in time, settings for clipping, edge blending and the like have not been configured, even though the image to be displayed has been input to the projectors 100*a* to 100*f*. Also, the control units 200*a* to 200*f* of the projectors 100*a* to 100*f* have not grasped that they have been grouped together. Also, it is assumed that the projectors 100*a* to 100*f* have started up and are all in the menu hidden state.

First, in steps S1201 and 1202, the user 105 starts up the application for setting multi-projection on the smartphone 106, and inputs the identification name of the current touch operation. At this time, the smartphone 106 executes step S500 and step S502 described above.

In step S1501, the user 105 selects the group setting menu from the menu selection screen displayed on the display panel 304 of the smartphone 106. This is equivalent to step S501 of the smartphone 106. In step S1502, the smartphone 106 broadcasts the existence inquiry signal over the network 104, in order to display the group setting menu. In step S1503, the projectors 100*a* to 100*f* execute the operation of step S407 with respect to the existence inquiry signal and transmit a response indicating existence. At this time, the smartphone 106 executes the operation of step S503 and detects the projectors 100*a* to 100*f* on the network.

In step S1504, the smartphone 106 executes the operation of step S504 described above, and displays the group setting menu. In step S1505, the user 105 touches the smartphone 106 to the projector 100*a*, in order to configure settings for adding the projector 100*a* to the multi-projection group. That is, the smartphone 106 executes the operation of step S206 described above, and the projector 100*a* executes the operation of step S105 described above. Furthermore, in step S1204, the projector 100*a* executes the operation of step S303 described above, and broadcasts a menu display state inquiry signal over the network 104. In response, projectors 100*b* to 100*f*, in step S1205, execute the operation of step S401 described above, and transmit a response indicating the menu hidden state to the projector 100*a*.

On the other hand, in step S1506, the smartphone 106 executes the operation of step S601 described above, and transmits a response indicating the group setting menu display state to the projector 100*a*.

In step S1507, the projector 100*a* executes the operation of step S306 described above, and transmits, to the smartphone 106 that performed the response indicating the group setting menu display state, communication (touch notification) indicating that the projector 100*a* was touched. This is in order for the projector 100*a* to cause the touch information of the projector 100*a* to be displayed in the group setting menu being displayed on the smartphone 106. Note that, in FIG. 15, description of the acknowledgment received back from the smartphone 106 that is the notification destination is omitted.

In step S1508, the smartphone 106 executes the operation of step S602 described above, and displays an icon in the column 507 on the line of the projector 100*a* in the group setting menu. Additionally, the checkbox of the column 508 on that line is checked (check mark is displayed).

In step S1509, the smartphone 106 executes the operation of step S603 described above, and transmits the group inclusion notification indicating inclusion in the group to the projector 100*a*. Note that, in FIG. 15, description of the acknowledgment received back from projectors that have been notified is omitted.

Next, description regarding the case where the user 105 touches the smartphone 106 to the projector 100*b* is omitted, since the processing is similar to the projector 100*a*.

Here, since the projector 100*f* is installed in a suspended manner as shown in FIG. 1, for example, it is assumed that it is difficult for the user 105 to touch the smartphone 106 to the projector 100*f*. Thus, in step S1510, the user 105 adds the projector 100*f* to a group, by operating the smartphone 106. At this time, the smartphone 106 executes the operation of step S505 described above, and displays a check mark in the checkbox of the column 508 on the line of the projector 100*f* in the table 506 of the group setting menu being displayed. In step S1511, the smartphone 106 executes the operation of step S506, and transmits the group inclusion notification indicating inclusion in the group to the projector 100*f*.

Next, in step S1512, the user 105 operates the smartphone 106 to end the group setting menu (Yes in step S508), and to execute the operation of step S509 described above and display the layout setting menu.

In step S1513, the user 105 operates the layout setting menu of the smartphone 106. At this time, the smartphone 106 executes the operation of step S510 described above. The smartphone 106 then executes step S511 described above, and transmits a layout setting instruction to the projectors 100*a*, 100*b* and 100*f* belonging to the group.

In step S1212, the projectors 100*a*, 100*b* and 100*f* execute the operation of step S408 described above, and perform multi-projection layout setting based on the received layout setting instruction. Adopting this configuration enables setting of multi-projection of the projectors 100*a*, 100*b* and 100*f* using the smartphone 106. Note that, in order to simplify description, a configuration using three projectors was described as an example. However, the present embodiment is not be limited thereto, and a configuration using the six projectors 100*a* to 100*f* may be adopted. Any configuration of two or more projectors may be adopted.

In the present embodiment as described above, the smartphone 106 displays the group setting menu following icon display, and it is thus identifiable whether projectors on the network joined the group due to being touched or joined the group due to a menu operation. By adopting this configuration, group setting of projectors can be performed while viewing the display of the smartphone 106, and it also becomes possible to easily grasp the projectors constituting multi-projection. That is, the task of setting multi-projection is made more efficient.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-221006, filed Nov. 16, 2017, which is hereby incorporated by reference herein in its entirety.

What is claimed is:

1. A projection apparatus that, in order to constitute an integrated screen obtained by combining a plurality of projection screens, projects one of the plurality of projection screens, comprising:
   at least one processor or circuit to perform the operations of the following units:
   a first reception unit configured to receive, from other projection apparatus, notification indicating that the other projection apparatus joined a projection apparatus group by a first designation method that involves moving an external apparatus into proximity; and
   a control unit configured to control a display to display a projection apparatus list for setting the projection apparatus group by a second designation method that involves designating a projection apparatus from among a plurality of projection apparatuses,
   wherein the control unit controls the display to display the projection apparatus list in a manner in which projection apparatuses that joined the group by the first designation method are identifiable based on the notification.

2. The projection apparatus according to claim 1, wherein the at least one processor or circuit further performs the operations of a second reception unit that is configured to receive information from the external apparatus via near-field wireless communication when the external apparatus moves into proximity,
   wherein the control unit, in a case where the second reception unit receives the information from the external apparatus, controls the display to display the projection apparatus list in a manner in which it is identifiable that the projector that includes the control unit joined the group by the first designation method.

3. The projection apparatus according to claim 2, wherein the information from the external apparatus includes an identifier that identifies the projection apparatus group.

4. The projection apparatus according to claim 1, wherein the notification include an identifier that identifies the projection apparatus group and is transmitted from the external apparatus to the other projection apparatus via near-field wireless communication when the external apparatus is moved into proximity.

5. The projection apparatus according to claim 1, wherein the control unit controls the display to display the projection apparatus list in which an icon indicating projection apparatuses that joined the group by the first designation method is displayed, in order to make projection apparatuses that joined the group by the first designation method identifiable.

6. The projection apparatus according to claim 3, wherein the control unit controls the display to display the projection apparatus list in which an identifier that identifies the projection apparatus group is displayed, in order to make projection apparatuses that joined the group by the first designation method identifiable.

7. The projection apparatus according to claim 6, wherein the control unit controls the display to display the projection apparatus list in which a display order is changed using the identifier that identifies the projection apparatus group.

8. The projection apparatus according to claim 6, wherein, in a case where the first reception unit receives the notification including a same identifier from a plurality of the other projection apparatuses, the control unit controls the display to display the projection apparatus list indicating that the plurality of other projection apparatuses have joined a same first group.

9. The projection apparatus according to claim 8, wherein the control unit controls the display to display the projection apparatus list to which a projection apparatus designated with the second designation method from among the plurality of projection apparatuses is further added to the first group.

10. The projection apparatus according to claim 1, wherein the second designation method is a method of designating a projection apparatus by checking a checkbox displayed in the list.

11. A communication apparatus that communicates with a projection apparatus that, in order to constitute an integrated screen obtained by combining a plurality of projection screens, projects one of the plurality of projection screens, comprising:

at least one processor or circuit to perform the operations of the following units:

a first reception unit configured to receive, from the projection apparatus, notification indicating that the projection apparatus joined a projection apparatus group by a first designation method that involves moving the communication apparatus into proximity; and a control unit configured to control a display to display a projection apparatus list for setting the projection apparatus group by a second designation method that involves designating a projection apparatus from among a plurality of projection apparatuses, wherein the control unit controls the display to display the projection apparatus list in a manner in which projection apparatuses that joined the group by the first designation method are identifiable based on the notification.

12. A projection system comprising a projection apparatus that, in order to constitute an integrated screen obtained by combining a plurality of projection screens, projects one of the plurality of projection screens and a communication apparatus that communicates with the projection apparatus, the communication apparatus comprising:

at least one processor or circuit to perform the operations of a communication unit that is configured to communicate with the projection apparatus via near-field wireless communication when the communication apparatus moves into proximity with the projection apparatus, and the projection apparatus comprising:

at least one processor or circuit to perform the operations of the following units:

a first reception unit configured to receive, from other projection apparatus, notification indicating that the other projection apparatus joined a projection apparatus group by a first designation method that involves moving the communication apparatus into proximity; and a control unit configured to control a display to display a projection apparatus list for setting the projection apparatus group by a second designation method that involves designating a projection apparatus from among a plurality of projection apparatuses, wherein the control unit controls the display to display the projection apparatus list in a manner in which projection apparatuses that joined the group by the first designation method are identifiable based on the notification.

13. A control method of a projection apparatus that, in order to constitute an integrated screen obtained by combining a plurality of projection screens, projects one of the plurality of projection screens, the method comprising:

receiving, from other projection apparatus, notification indicating that the other projection apparatus joined a projection apparatus group by a first designation method that involves moving an external apparatus into proximity; and controlling a display to display a projection apparatus list for setting the projection apparatus group by a second designation method that involves designating a projection apparatus from among a plurality of projection apparatuses, wherein, in the controlling, the display is controlled to display the projection apparatus list in a manner in which projection apparatuses that joined the group by the first designation method are identifiable based on the notification.

14. A non-transitory computer-readable storage medium storing a program for causing a computer to execute a control method of a projection apparatus, the method comprising:

receiving, from other projection apparatus, notification indicating that the other projection apparatus joined a projection apparatus group by a first designation method that involves moving an external apparatus into proximity; and controlling a display to display a projection apparatus list for setting the projection apparatus group by a second designation method that involves designating a projection apparatus from among a plurality of projection apparatuses, wherein, in the controlling, the display is controlled to display the projection apparatus list in a manner in which projection apparatuses that joined the group by the first designation method are identifiable based on the notification.

15. A control method of a communication apparatus that communicates with a projection apparatus that, in order to constitute an integrated screen obtained by combining a plurality of projection screens, projects one of the plurality of projection screens, the method comprising:

receiving, from the projection apparatus, notification indicating that the projection apparatus joined a projection apparatus group by a first designation method that involves moving the communication apparatus into proximity; and controlling a display to display a projection apparatus list for setting the projection apparatus group by a second designation method that involves designating a projection apparatus from among a plurality of projection apparatuses, wherein, in the controlling, the display is controlled to display the projection apparatus list in a manner in which projection apparatuses that joined the group by the first designation method are identifiable based on the notification.

16. A non-transitory computer-readable storage medium storing a program for causing a computer to execute a control method of a communication apparatus that communicates with a projection apparatus that, in order to constitute an integrated screen obtained by combining a plurality of projection screens, projects one of the plurality of projection screens, the method comprising:

receiving, from the projection apparatus, notification indicating that the projection apparatus joined a projection apparatus group by a first designation method that involves moving the communication apparatus into proximity; and controlling a display to display a projection apparatus list for setting the projection apparatus group by a second designation method that involves designating a projection apparatus from among a plurality of projection apparatuses, wherein, in the controlling, the display is controlled to display the projection apparatus list in a manner in which projection apparatuses that joined the group by the first designation method are identifiable based on the notification.

* * * * *